(12) United States Patent
Suzuki et al.

(10) Patent No.: US 7,052,149 B2
(45) Date of Patent: May 30, 2006

(54) EXTERIOR VEHICLE MIRROR WITH AUXILIARY MIRROR HAVING POSITION MARKER INDICATING POSITION OF VEHICLE

(75) Inventors: Hisaya Suzuki, Shizuoka (JP);
Masaaki Matsuura, Shizuoka (JP);
Masahiro Motomiya, Shizuoka (JP);
Tohru Yamana, Shizuoka (JP)

(73) Assignee: Murakami Corporation, Shizuoka (JP)

(*) Notice: Subject to any disclaimer, the term of this patent is extended or adjusted under 35 U.S.C. 154(b) by 75 days.

(21) Appl. No.: 10/722,476

(22) Filed: Nov. 28, 2003

(65) Prior Publication Data

US 2004/0120055 A1 Jun. 24, 2004

(30) Foreign Application Priority Data

| Dec. 20, 2002 | (JP) | ............................. 2002-369816 |
| Dec. 20, 2002 | (JP) | ............................. 2002-370175 |
| Mar. 6, 2003 | (JP) | ............................. 2003-059462 |
| Jul. 31, 2003 | (JP) | ............................. 2003-283261 |
| Aug. 29, 2003 | (JP) | ............................. 2003-305919 |

(51) Int. Cl.
*B60R 1/06* (2006.01)
*B60R 1/08* (2006.01)
*G02B 7/182* (2006.01)

(52) U.S. Cl. ........................ 359/850; 359/838; 359/872

(58) Field of Classification Search ................ 359/838, 359/841, 850, 864, 865, 872, 877
See application file for complete search history.

(56) References Cited

U.S. PATENT DOCUMENTS

| 4,678,294 | A | * | 7/1987 | Van Nostrand | ............. 359/864 |
| 4,730,926 | A | * | 3/1988 | Wedemeyer | ................ 356/138 |
| 4,890,907 | A |   | 1/1990 | Vu et al. | ..................... 359/509 |
| 5,022,747 | A | * | 6/1991 | Polanyi et al. | .............. 359/850 |
| 5,226,034 | A | * | 7/1993 | Nagayama et al. | ......... 359/873 |
| 5,500,773 | A | * | 3/1996 | Easter | ......................... 359/838 |
| 5,594,585 | A | * | 1/1997 | Komatsu | ..................... 359/512 |

(Continued)

FOREIGN PATENT DOCUMENTS

DE 3613556 A1 * 10/1987

(Continued)

OTHER PUBLICATIONS

PTO 2005-4518, "Automobile Door Mirror", English-language translation of Japanese Utility Model S60-128838 (Aug. 29 1985 to Sugimoto Masaki). United States Patent and Trademark Office (Translation Services), Jul. 2005.*

*Primary Examiner*—John Juba, Jr.
(74) *Attorney, Agent, or Firm*—Oblon, Spivak, McClelland, Maier & Neustadt, P.C.

(57) ABSTRACT

The present invention provides an outer mirrors installed in an automobile, that has a capability to be reset into a housing position, features to have auxiliary mirrors to percept and monitor the front wheels and thereabout, has a flexibility for well appreciated apparent design, has no reflection of head lamp lights of oncoming automobiles thereby and is capable to perform the function of the auxiliary mirror in the night or in the dark place. The outer mirror comprises a mirror base extending outward and a mirror housing, being capable to be reset into the housing position, suspended under the mirror base with a rotation capability thereunder and a separation distance from the automobile, wherein a first auxiliary mirror facing obliquely downward is attached to the mirror housing on the surface facing to the automobile body.

20 Claims, 30 Drawing Sheets

U.S. PATENT DOCUMENTS

| | | | |
|---|---|---|---|
| 5,953,158 A | 9/1999 | Kamakura et al. | 359/843 |
| 6,015,215 A * | 1/2000 | Herman | 359/864 |
| 6,811,288 B1 * | 11/2004 | Hutzel | 359/864 |

FOREIGN PATENT DOCUMENTS

| | | |
|---|---|---|
| EP | 0 333 220 | 9/1989 |
| EP | 0 396 930 A1 * | 11/1990 |
| GB | 2295129 A * | 5/1996 |
| JP | 60-128838 | 8/1985 |
| JP | 63-134853 | 9/1988 |
| JP | 05-229387 A * | 9/1993 |
| JP | 08-058473 A * | 3/1996 |
| JP | 08-238984 A * | 9/1996 |
| JP | 09-150674 | 6/1997 |
| JP | 2001-039221 | 2/2001 |
| JP | 2001-253298 A * | 9/2001 |

* cited by examiner

EXTERIOR VEHICLE MIRROR WITH AUXILIARY MIRROR HAVING POSITION MARKER INDICATING POSITION OF VEHICLE

FIELD OF THE INVENTION

The present invention relates to an outer mirror which is a mirror unit, having various functions, set on a side door or close to a side door of an automobile. The present invention also relates to a side area illuminating device which illuminates door steps of the automobile.

BACK GROUND OF THE INVENTION

Drivers of automobiles cannot directly do visual monitoring of the front wheels and the rear wheels while they are driving. When two automobile pass each other on narrow roads, they sometimes drive the wheels bumping to curb stones or running out of curb lines, drop wheels into gutters or rub the other automobile with their automobiles.

In order to solve these problems, an auxiliary mirror set on the fenders for the front wheels at the side of the passenger seat has been used for visually checking the front wheel of the side of the passenger seat. However such an auxiliary mirror which is projecting from the fender surface damages the apparent automobile design that should be based on a streamline shape which is popular now-a-day. The projection from the fender surface cannot avoid the dead viewing angle for the use of such auxiliary mirror due to the presence of the fender surface to which the fender mirror is attached and therefore the auxiliary mirror has not been widely adopted for many automobiles.

In this back ground of the technology, a construction has been proposed such that a conventional auxiliary mirror to visually percept and monitor the front wheels is attached to the outer mirror which is set on the side door or the side portion of the automobile and used for visually monitoring the rear side of the automobile (for example, ref. 1, ref. 2 and ref. 3 in IDS).

As for the performance of the outer mirror, highly visual perception and monitoring capability and the housing capability to be reset into a housing position at the time of parking are essential requirements for the functions. Good apparent design and less window disturbing noise are required as well. Therefore, when an auxiliary mirror is attached to the outer mirror, the auxiliary mirror has to satisfy the requirements such as housing capability at the time of parking, good apparent design and less window disturbing noise, in addition to the highly visual perception and monitoring capability. In addition to these requirement, other safety requirements such that the perception and monitoring capability in the use of the auxiliary mirror in the night or the dark places or the reflected glaring lights of head lamp lights of oncoming automobiles do not intrude in the sights of drivers, have to be considered for the function of the auxiliary mirror. However no conventional auxiliary mirrors have been able to solely solve all these problems.

Under these requirements for auxiliary mirrors, the elements of the technical requirements for outer mirrors that have auxiliary mirrors are to support the drivers to visually percept and monitor the front wheels or rear wheels thereabout, not to reflect the head lamp lights from oncoming automobiles, to keep the monitoring capability in the use of the auxiliary mirror in the night or the dark places and to have a capability to be reset into housing position and a flexibility for well appreciated apparent design.

The FIG. 33 shows a conventional outer mirror that has a conventional door step illuminating device therein. An electric lamp 250 is set in a lamp house 230 which locates in the inside of the mirror housing 210 of the outer mirror and the mirror housing is formed into a shape projecting in the rear direction of the rear end of the outer mirror. The open window of the lamp house 230 and a lens 240 are set in a design such that the light of the electric lamp illuminates a half area of the mirror 220.

This conventional door step illuminating device has been used for a traffic indicator where the electric lamp 250 flushes on and off by using a directional indicator lever and the light of the electric lamp 250 is projected to the side rear direction of the automobile through the lens 240 and the reflection at the mirror 220 (see ref. 4 in IDS).

However, this conventional door step illuminating device has a problem such that the lamp housing 210 having the electric lamp 250 is formed within the mirror housing so that the mirror housing resultantly has a large physical size and the flexibility of a physical design is limited.

The wire harness of the wires to supply the electricity to the lamp 250 set in a lamp housing 230 is led through a hole formed in the shaft supporting and rotating the mirror housing. Since the quantity of the wires in the wire harness is limited by the inner diameter of the hole formed in the shaft, the quantity of wires has to be reduced once the power line wires for the electric lamp 250 are added so that the other electrical components installed in the mirror housing 210 are limited with respect to the kinds or the functions and that a laborious assembling job is required in the automobile production line.

The other problem has been pointed out such that the illuminated range of the area is limited since the illumination device is fixed in the mirror housing 210.

Therefore an outer mirror has been required such that the physical size is not so large, various components can be installed in the mirror housing, all these components are not limited in their functions, the assembling job is rather easy, and the many areas can be illuminated thereby.

BRIEF SUMMARY OF INVENTION

The present invention has advantages to satisfy the above requirements for enhancing the visual perception and monitoring capability and the flexibility for well appreciated apparent design and not limiting the functionality of other components installed in the outer mirror. In order to achieve these requirements, the present invention has technical features such that the visual range of the outer mirror is wider than the fender mirrors so that the front side and the back side area around the automobile can monitored, the door side mirror provides a wider view angle for the drivers and the mirror base that suspends the mirror housing can accommodates various electrical apparatus inside. The present invention provides further advantages in raising these features in order to achieve the ultimate purpose for enhancement of safety driving capability.

A fundamental element of the present invention is an auxiliary mirror which is equipped with an outer mirror that comprises a mirror base extending sideward from the side surface of the automobile body and the mirror housing suspended underneath the mirror base with rotational motion flexibility and capability to be reset into a housing position. The position of the installation of the auxiliary mirror is to be on a side of the mirror housing. The present invention can enhance the advantages and effects in a combination with other components and an associated technology.

DETAILED DESCRIPTION OF THE INVENTION

Figure 1:
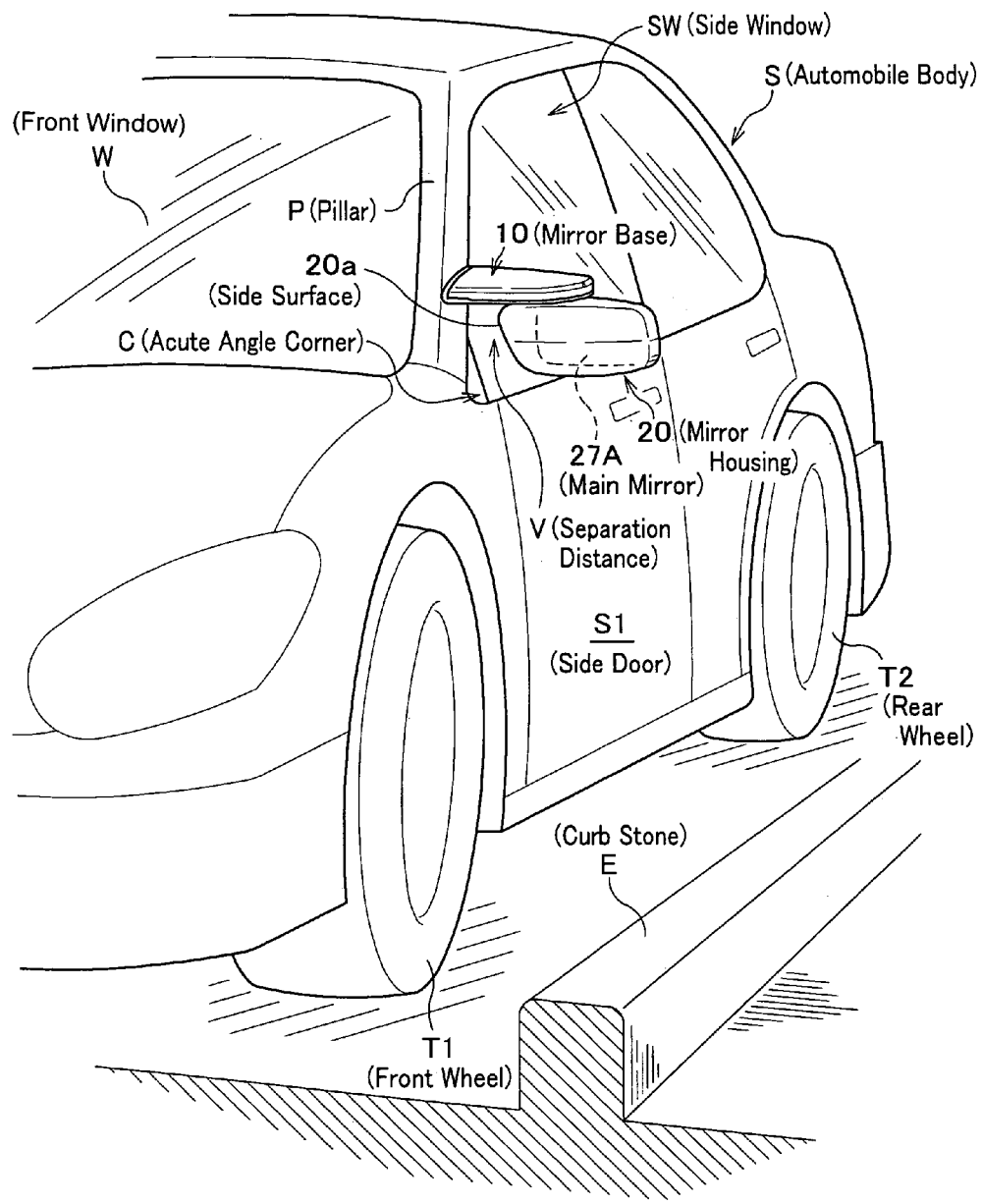
FIG. 1 is a perspective drawing that shows an outer mirror according to the first embodiment.

The technical details of the present invention is discussed in the following with showing the items of claims as references so that the technical implication is further provided for the understanding of advantages of the present invention.

The invention provided in a first embodiment features that the outer mirror that has a capability to be reset into a housing position and comprises a mirror base extending sideward from the side surface of the automobile body to which the mirror base is attached and a mirror housing which is suspended under the mirror base with rotational capability to be reset into a housing position and with a separation distance against the automobile body. A first auxiliary mirror is installed in the side of the mirror housing and is set facing obliquely downward.

The outer mirror in the present invention has a construction that a mirror housing is suspended underneath the mirror base extending sideward from the side surface of the automobile body is attached thereon. The mirror housing has a separation distance against the side of the automobile and rotational movement flexibility against the mirror base. All these construction can provide high adaptive apparent design and can be fitted to various kinds of automobiles.

The separation distance between the sides of the automobile and the mirror housing is kept in certain separation distance, the air flow surrounding the automobile is less cut by the projecting shape of the out mirror since the separation distance works as a path through which the air flow can be smoothly passing to the rear side of the automobile. The air turbulence by the outer mirror is suppressed by this construction and the window disturbing noise is less generated.

For the conventional outer mirror that has a mirror base locating under the mirror housing, an auxiliary mirror attached to the side of the mirror housing reflects the mirror base since the driver eyes are higher than the auxiliary mirror and the mirror base is lower than the auxiliary mirror. As the result, the view reflected in the auxiliary mirror is effectively narrower than the potential view necessary to be shown in the auxiliary mirror. However, in the present invention, the mirror base locates in relatively upper position against the mirror housing and therefore the auxiliary mirror does not reflect the mirror base so that the range of visual perception is not narrowed in use of the first auxiliary mirror according to the present invention.

Since the first auxiliary mirror is set facing obliquely downward, no lights projected from the head lamp of the other oncoming passing automobiles are reflected by the first auxiliary mirror and therefore do not intrude in the driver sight.

Since the mirror housing can rotate under the mirror base, the scope in the view of the first auxiliary can be adjusted by the rotational position of the mirror housing.

The invention according to another embodiment features that the first auxiliary mirror according to a first embodiment is divided into two mirrors, one of which is facing frontward of the automobile and the other to the rearward.

By using such outer mirror, it is possible for the driver to visually percept and monitor the front wheels, the rear wheels and their surrounding areas.

The invention according to another embodiment features that the outer mirror according to a first embodiment has a mirror base to which a second auxiliary mirror is attached on the side facing rearward of the automobile and that the second auxiliary mirror is set facing obliquely downward.

By using such outer mirror, the driver can visually percept and monitor the rear wheels and thereabout. Since the mirror base is not reflected on the second auxiliary mirror, the viewing range of perception and monitoring cannot be narrowed.

Since the second auxiliary mirror is set facing to obliquely downward, the head lamp lights of the automobile chasing or upcoming from the rear side are not reflected to the driver eyes and the second auxiliary mirror does not intrude in the sight view of the driver by such light reflection.

The invention according to another embodiment features that the direction of second auxiliary mirror according to another embodiment can be adjusted.

By using such adjustable auxiliary mirror, the viewing range of perception and monitoring is not narrowed even against changing the position of the seat or the sitting height of the driver. By taking a pivot mechanism in the mounting connection of the second auxiliary mirror onto the mirror base, the directional adjustment of the second auxiliary mirror can have flexibility for the adjustment. Installing an electric actuator for such pivot mechanism, the directional adjustment of the second auxiliary mirror can be controlled and carried out by a remote control switches set in the cabin of the automobile.

The invention according to another embodiment features that the outer mirror according to another embodiment has a second auxiliary mirror which has a position marker indicating the position of the automobile.

By using such outer mirror, the driver can recognize the relative position of the automobile against the view reflected on the second auxiliary mirror even the image of the automobile body is not reflected.

The invention according to another embodiment features that the outer mirror according to another embodiment has a position marker that can emit lights.

By using such outer mirror, the position marker can be visually seen in the night or the dark places and therefore it is possible to easily recognize the relative position of the automobile.

The invention according to another embodiment features that the outer mirror according to another embodiment has an additional auxiliary position marker indicating the position of the automobile between the second auxiliary mirror and the driver.

By using such outer mirror, there is no difference of stopping position of the automobile against the difference of the drivers once the drivers recognize the position marker and an auxiliary position marker overlapping on the second auxiliary mirror. For example, once the driver drives the automobile in such a way that the curb stone image coincides with the position marker (therefore, the auxiliary potion marker, as well) after confirming that the position marker and the auxiliary position marker overlap on the second auxiliary mirror when he or she is driving closely up to the side way, then it is possible to keep the automobile in a certain distance apart from the curb stones in the closely approaching up to the side way whatever the driver's skill is. The auxiliary position marker can be formed in the side window of on the side door which is between the second auxiliary mirror and the driver seat.

The invention according to another embodiment features that the outer mirror according to another embodiment has an auxiliary position marker that has a mechanism to be popped up from a side door for the time to use and popped down into the side door for the time of out of use.

By using such outer mirror, the auxiliary position marker does not damage the apparent design of the automobiles. Because the auxiliary position marker pops up when the driver check to seen the position using the second auxiliary mirror and the auxiliary position marker is set back into housing position for disappearing.

The invention according to another embodiment features that the outer mirror according to another embodiment has an auxiliary position marker that can emit the light.

By using such outer mirror, it is possible to surely confirm the presence of the auxiliary maker even in the night of in the dark place. Therefore it is possible to monitor the place of automobile in the night and in the dark place.

The invention according to another embodiment features that the outer mirror according to another embodiment has the secondary auxiliary mirror that has a functional film formed on the surface so that the possibility of the visual sight of the second auxiliary mirror is maintained.

By using such outer mirror, it is possible to enhance the visual perception and monitoring capability of the presence of the second auxiliary mirror due to the functional film formed on the surface of the second auxiliary mirror. The examples of the functional films are a hydrophilic film that can diffuse the water drop over the mirror surface and a repellent film so that the water drips on the mirror surface are dropped away. It can be possible to maintain the visual sight of the second auxiliary mirror even in the rainy weather.

The invention according to another ambodiment features that the outer mirror according to another embodiment has a mirror base that has a light beam emitting device that illuminates the area aside from the automobile and the areas in the range of the road area viewed in the second auxiliary mirror.

By using such outer mirror, the converged light is projected onto the road area which is aside the automobile and which is in the range of the view of the second auxiliary mirror. Therefore the driver can confirm the relative position of the automobile against the road. Since the light projected area has the constant separation distance from the automobile body, the illuminated area viewed on the second auxiliary mirror shows the position of the automobile in a relative separation distance to such area regardless to the seat position of the driver. When the driver drives on the sideway close up to the curb stones, the view of the curb stones coincides with the projected light can lead the automobile to have a constant distance from the curb stones regardless to driving skill of the driver is. The road area is illuminated by the light beam emitting device, the position of the automobile can be surely confirmed even in the night or in the dark place.

The invention according to another embodiment features that the outer mirror according to a first embodiment has a mirror housing that has a sub mirror in the lower potion of the open window of rear side, wherein the sub mirror is partitioned from and below the main mirror.

By using such outer mirror, it is possible to percept and monitor the rear wheels and thereabout. Since a partition is formed between the main mirror and the sub mirror, it is not necessary to continuously change the mirror curvature and it is possible to select the main mirror and the sub mirror to meet the purpose independently. In other words, it is possible to assign different range of perception and monitoring capability for each mirror so that high perception and monitoring capability can be obtained. Since the sub mirror works for watching the rear wheels and thereabout and the main mirror works for watching other vehicles in the rear side of the automobile, the monitoring of these dual views can be possible at the same time.

Since the sub mirror is facing obliquely downward and slantingly rearward, no head lamp lights emitted by the vehicles running behind can intrude in the sight of the driver by the light reflection on the sub mirror. The mirror housing is installed in a rotational flexibility and therefore the view range obtained by the sub mirror can be adjusted by changing the installation angle.

The invention according to another embodiment features that the outer mirror according to another embodiment has a sub mirror of which direction can be adjusted.

By using such outer mirror, the viewing range of the sub mirror is not narrowed even the sitting height or the sitting position of the driver varies because the direction of the mirror can be adjusted. In addition, it is possible to adjust the direction of the sub mirror by hands if the sub mirror is attached to the mirror housing through a pivot mechanism. A construction such that the sub mirror is attached to the mirror housing through a actuator which has an electric motor can allow to change the direction of sub mirror by using a remote controller equipped inside the cabin.

The invention according to another embodiment features that the outer mirror according to another embodiment has a sub mirror that has a functional film formed on the surface of the sub mirror in order to maintains the perception and monitoring capability.

By using such outer mirror, it is possible to enhance the perception and monitoring capability of the sub mirror since a functional film is formed on the surface of the sub mirror. The functional films can be a hydrophilic film that can diffuse the water and rain drips over the mirror surface and a repellent film so that the water and rain drips on the mirror surface are dropped away. It can be possible to maintain the visual sight of the sub mirror even in the rainy weather.

The invention according to another embodiment features that the outer mirror according to a first embodiment has a first auxiliary mirror which has a position marker indicating the position of the automobile.

By using such outer mirror, it is possible to adjust the direction of the first auxiliary mirror and then the viewing range of the sub mirror is not narrowed even the sitting height or the sitting position of the driver varies because the direction of the mirror can be adjusted. In addition, it is possible to adjust the direction of the first auxiliary mirror by hands if the first auxiliary mirror is attached to the mirror housing through a pivot mechanism. A construction such that the first auxiliary mirror is attached to the mirror housing through a actuator which has an electric motor can allow to change the direction of the first auxiliary mirror by using a remote controller equipped inside the cabin.

The invention according to another embodiment features that the outer mirror according to a first embodiment has a first auxiliary mirror that has a position marker indicating the position of the automobile.

By using such outer mirror, the driver can recognize the relative position of the automobile against the view reflected on the first auxiliary mirror even the image of the automobile body is not reflected.

The invention according to another embodiment features that the outer mirror according to another embodiment has a position marker that can emit the light.

By using such outer mirror, it is possible to surely confirm the presence of the first auxiliary maker even in the night of in the dark place. Therefore it is possible to monitor the place of automobile in the night and in the dark place.

The invention according to another embodiment features that the outer mirror according to another embodiment has an auxiliary position marker between the first auxiliary mirror and the driver seat.

By using such outer mirror, there is no difference of stopping position of the automobile against the difference of the drivers once the drivers recognize the position marker and an auxiliary marker overlapping on the fist auxiliary mirror. For example, once the driver drives the automobile in such a way that the curb stone image coincides with the position marker (therefore, the auxiliary potion marker, as well) after confirming that the position marker and the auxiliary position marker overlap on the first auxiliary mirror when he or she is driving close up to the side way, then it is possible to keep the automobile in a certain distance apart from the curb stones in closely approaching up to the side way whatever the driver's skill is. The auxiliary position marker can be formed in the side window of on the side door which is between the first auxiliary mirror and the driver seat.

The invention according to another embodiment features that the outer mirror according to another embodiment has an auxiliary position marker that can be popped up from a side door for use.

By using such outer mirror, the auxiliary position marker does not damage the apparent design of the automobiles. Because the auxiliary position marker pops up when the driver check the position using the first auxiliary mirror and the auxiliary position marker is set back into housing position for disappearing.

The invention according to another embodiment features that the outer mirror according to another embodiment has an auxiliary position marker that can emit the light.

By using such outer mirror, it is possible to surely confirm the presence of the auxiliary position maker even in the night of in the dark place. Therefore it is possible to monitor the place of automobile in the night and in the dark place.

The invention according to another embodiment features that the outer mirror according to another embodiment has a first auxiliary mirror that has a functional film formed on the surface of the sub mirror in order to maintain the perception and monitoring capability.

By using such outer mirror, it is possible to enhance the perception and monitoring capability of the first auxiliary mirror since a functional film is formed on the surface of the first auxiliary mirror. The functional films can be a hydrophilic film that can diffuse the water and rain drips over the mirror surface and a repellent film so that the water and rain drips on the mirror surface are dropped away. It can be possible to maintain the visual sight of the fist auxiliary mirror even in the rainy weather.

The invention according to another embodiment features that the outer mirror according to one of the other embodiments has a mirror base that has a light beam emitting device that illuminates the area aside from the automobile and the areas in the range of the road area viewed in the first auxiliary mirror.

By using such outer mirror, the converged light is projected onto the road area which is aside the automobile and which is in the range of the view of the first auxiliary mirror. Therefore the driver can confirm the relative position of the automobile against the road. Since the light projected area has the constant separation distance from the automobile body, the illuminated area viewed on the first auxiliary mirror shows the position of the automobile in a relative separation distance to such area regardless to the seat position of the driver. When the driver drives on the sideway close up to the curb stones, the view of the curb stones coincides with the projected light can lead the automobile to have a constant distance from the curb stones regardless to driving skill of the driver is. Since the road area is illuminated by the light beam emitting device, the position of the automobile can be surely confirmed even in the night or in the dark place.

The invention provided in another embodiment features that the outer mirror that has a capability to be reset into a housing position and comprises a mirror base extending sideward from the side surface of the automobile body to which the mirror base is attached and a mirror housing which is suspended under the mirror base with rotational movement flexibility with a separation distance against the automobile body. A second auxiliary mirror is installed in the side of the mirror housing and is set facing obliquely downward.

By using such an outer mirror, high adaptive apparent design can be obtained and can be fitted to various kinds of automobiles. Since the separation distance between the sides of the automobile and the mirror housing is kept, the air flow surrounding the automobile is less cut by the projecting shape of the out mirror since the separation distance works as a path through which the air flow can smoothly be passed to the backside of the automobile. The air turbulence by the outer mirror is suppressed by this construction and the window disturbing noise is less generated.

A second auxiliary mirror attached to the mirror housing on the side facing to the automobile body but rear side from the first auxiliary mirror does not reflect the mirror base so that the range of visual perception is not narrowed in use of the second auxiliary mirror according to the present invention.

Since the second auxiliary mirror is set facing to obliquely downward, no the head lamp lights projected by the other oncoming automobiles is reflected by the first auxiliary mirror and does not intrude in the driver sight.

The invention according to another embodiment features that the outer mirror according to another embodiment has a second auxiliary mirror of which direction can be adjusted.

By using such outer mirror, the viewing range of the second auxiliary mirror is not narrowed even the sitting height or the sitting position of the driver varies because the direction of the mirror can be adjusted. In addition, it is possible to adjust the direction of the second auxiliary mirror by hands if the second auxiliary mirror is attached to the mirror housing through a pivot mechanism. A construction such that the second auxiliary mirror is attached to the mirror housing through a actuator which has an electric motor can allow to change the direction of second auxiliary mirror by using a remote controller equipped inside the cabin.

The invention according to another embodiment features that the outer mirror according to another embodiment has a second auxiliary mirror that has a position marker indicating the position of the automobile.

By using such outer mirror, the driver can recognize the relative position of the automobile against the view reflected on the second auxiliary mirror even the image of the automobile body is not reflected.

The invention according to another embodiment features that the outer mirror according to another embodiment has an auxiliary position marker that can emit the light.

By using such outer mirror, it is possible to surely confirm the presence of the second auxiliary position maker even in the night of in the dark place. Therefore it is possible to monitor the place of automobile in the night and in the dark place.

The invention according to another embodiment features that the outer mirror according to another embodiment has an auxiliary position marker between the second auxiliary mirror and the driver seat.

By using such outer mirror, there is no difference of stopping position of the automobile against the difference of the drivers once the drivers recognize the position marker and an auxiliary marker overlapping on the second auxiliary mirror. For example, once the driver drives the automobile in such a way that the curb stone image coincides with the position marker (therefore, the auxiliary potion marker, as well) after confirming that the position marker and the auxiliary position marker overlap on the second auxiliary mirror when he or she is driving close up to the side way, then it is possible to keep the automobile in a certain distance from the curb stones in closely approaching up to the side way whatever the driver's skill is. The auxiliary position marker can be formed in the side window of on the side door which is between the second auxiliary mirror and the driver seat.

The invention according to another embodiment features that the outer mirror according to another embodiment has the auxiliary position marker that can be popped up from a side door for use.

By using such outer mirror, the auxiliary position marker does not damage the apparent design of the automobiles. Because the auxiliary position marker is popped up when the driver check to see the position using the second auxiliary mirror and the auxiliary position marker is set back into housing position for disappearing.

The invention according to another embodiment features that the outer mirror according to another embodiment has an auxiliary position marker that can emit the light.

By using such outer mirror, it is possible to surely confirm the presence of the auxiliary position maker even in the night of in the dark place. Therefore it is possible to monitor the place of automobile in the night and in the dark place.

The invention according to another embodiment features that the outer mirror according to another embodiment has the secondary auxiliary mirror that has a functional film formed on the surface so that the possibility of the visual sight of the second auxiliary mirror is maintained.

By using such outer mirror, it is possible to enhance the visual perception capability of the presence of the second auxiliary mirror due to the functional film formed on the surface of the second auxiliary mirror. The examples of the functional films are a hydrophilic film that can diffuse the water and rain drips over the mirror surface and a repellent film so that the water and drips on the mirror surface are dropped away. It can be possible to maintain the visual sight of the second auxiliary mirror even in the rainy weather.

The invention according to another embodiment features that the outer mirror according to one of the other embodiments has a mirror base that has a light beam emitting device that illuminates aside the automobile and the areas in the range of the road area viewed in the second auxiliary mirror.

By using such outer mirror, the converged light is projected onto the road area which is aside the automobile and which is in the range of the view of the second auxiliary mirror. Therefore the driver can confirm the relative position of the automobile against the road. Since the light projected area has the constant separation distance from the automobile body, the illuminated area viewed on the second auxiliary mirror shows the position of the automobile in a relative separation distance to such area regardless to the seat position of the driver. When the driver drives on the sideway close up to the curb stones, the view of the curb stones coincides with the projected light can lead the automobile to have a constant distance from the curb stones regardless to driving skill of the driver is. Since the road area is illuminated by the light beam emitting device, the position of the automobile can be surely confirmed even in the night or in the dark place.

The invention provided in another embodiment features that the outer mirror that has a capability to be reset into a housing position and comprises a mirror base extending sideward from the side surface of the automobile body to which the mirror base is attached and a mirror housing which is suspended under the mirror base with rotational movement flexibility with a separation distance against the automobile body.

A sub mirror is installed in the lower potion of the open window of rear side, wherein the sub mirror is partitioned below the main mirror and is set facing obliquely downward.

By using such outer mirror, it is possible to percept and monitor the rear wheels and thereabout. Since a partition is formed between the main mirror and the sub mirror, it is not necessary to continuously change the mirror curvature and select the main mirror and the sub mirror to meet the purpose independently. In other words, it is possible to assign different range of perception and monitoring capability so that high perception and monitoring capability can be obtained. Since the sub mirror works for watching the rear wheels and thereabout and the main mirror works for watching other vehicles in the back side of the automobile, the monitoring of these dual views can be possible at the same time.

Since the sub mirror is facing obliquely rearward of the automobile body, no head lamp lights emitted by the vehicles running behind can intrude in the sight of the driver by the mirror reflection. The mirror housing is installed in a rotational flexibility and therefore the view range obtained by the sub mirror can be adjusted by changing the installation angle.

The invention according to another embodiment features that the outer mirror according to another embodiment has a sub mirror of which direction can be adjusted.

By using such outer mirror, the viewing range of the sub mirror is not narrowed even the sitting height or the sitting position of the driver varies because the direction of the mirror can be adjusted. In addition, it is possible to adjust the direction of the sub mirror by hands if the sub mirror is attached to the mirror housing through a pivot mechanism. A construction such that the sub mirror is attached to the mirror housing through a actuator which has an electric motor can allow to change the direction of sub mirror by using a remote controller equipped inside the cabin.

The invention according to another embodiment features that the outer mirror according to the other embodiments has a sub mirror that has a functional film formed on the surface of the sub mirror in order to maintain the perception and monitoring capability.

By using such outer mirror, it is possible to enhance the perception and monitoring capability of the sub mirror since a functional film is formed on the surface of the sub mirror. The functional films can be a hydrophilic film that can diffuse the water and rain drips over the mirror surface and a repellent film so that the water and rain drips on the mirror surface are dropped away. It can be possible to maintain the visual sight of the sub mirror even in the rainy weather.

An door step illuminating device according to another embodiment comprises an outer mirror that composes of a mirror base extending sideward from the side surface of the automobile to which the mirror base is attached and a mirror housing which is suspended under the mirror base with a separation distance against the automobile body, an illuminating light reflecting mirror attached to a mirror housing on the side surface facing to the automobile and a light emitting unit installed in the mirror base wherein the light emitting unit emits the light to the illuminating light reflecting mirror and the area of door step is illuminated.

An door step illuminating device according to the present invention can illuminate the area of the door step by the light emitted from the light emitting unit that is reflected on the illumination mirror attached to a mirror housing on the side surface facing to the automobile wherein the mirror housing is suspended underneath the mirror base with a separation distance from the automobile.

Since the light emitting unit can be segregated from the mirror housing, the physical size of the mirror housing does not increase and can be kept in a compact size. The flexibility of the design can be kept high and no additional components or harness is necessary and no limitation of kinds or functions of other electrical components installed in the mirror housing as seen in the case of the conventional mirror housing wherein the illumination device is fixed in the mirror housing.

Since the door step illuminating device according to the present invention has an indirect illumination scheme, it is possible to illuminate various range of areas by selecting the installation position and angle of the light emitting unit or the direction of the illumination mirror.

The invention according to another embodiment features that the door step illumination device according another embodiment has the illuminating light reflecting mirror which is a surface-coated mirror.

According to the door step illumination device, the illuminating light reflecting mirror has the refection surface directly on the surface of the mirror which is mirror-coated. Therefore the reflectivity is higher than the mirror that has a mirror surface in the back side of the mirror. A multiple reflection between the surface of mirror substrate and the coated mirror surface is generated and the total reflectivity is decreased and the fringing area of the light illumination becomes blurred.

The invention according to another embodiment features that the door step illumination device according to the other embodiments has the light emitting unit which emits the light in response to the locking and unlocking of the automobile door.

According to the door step illumination device, the light emitting unit can emit the light in response to the locking and unlocking operation of the automobile doors and therefore the locking and unlocking in the dark place can be easily done.

EMBODIMENT OF THE INVENTION

The embodiments of the present invention will be explained in detail with referring the attached drawings. The definition of the words "front", "rear", "left", "right", "upper" and "lower" are determined by the nominal figure of the automobile.

In the explanation, the same codes will be used for the same elements and same discussions will be repeated over the drawings and in the following discussion, respectively.

The First Embodiment

As shown in FIG. 1, the outer mirror according to the first embodiment of the present invention is so-called a door mirror that is mounted on the place around the side door installed in the automobile body S. The outer mirror comprises a mirror base 10 extending sideward from the side surface of the automobile body, a mirror housing suspended underneath the mirror base 10 with rotational motion flexibility and a separation distance V from the automobile body. A main mirror 27A to percept and monitor the rear side of the automobile is attached on a window, opening to the rear direction, of the mirror housing and a first auxiliary mirror 30 is attached on the side surface 20a, facing to the automobile body, of the mirror housing.

Figure 3:
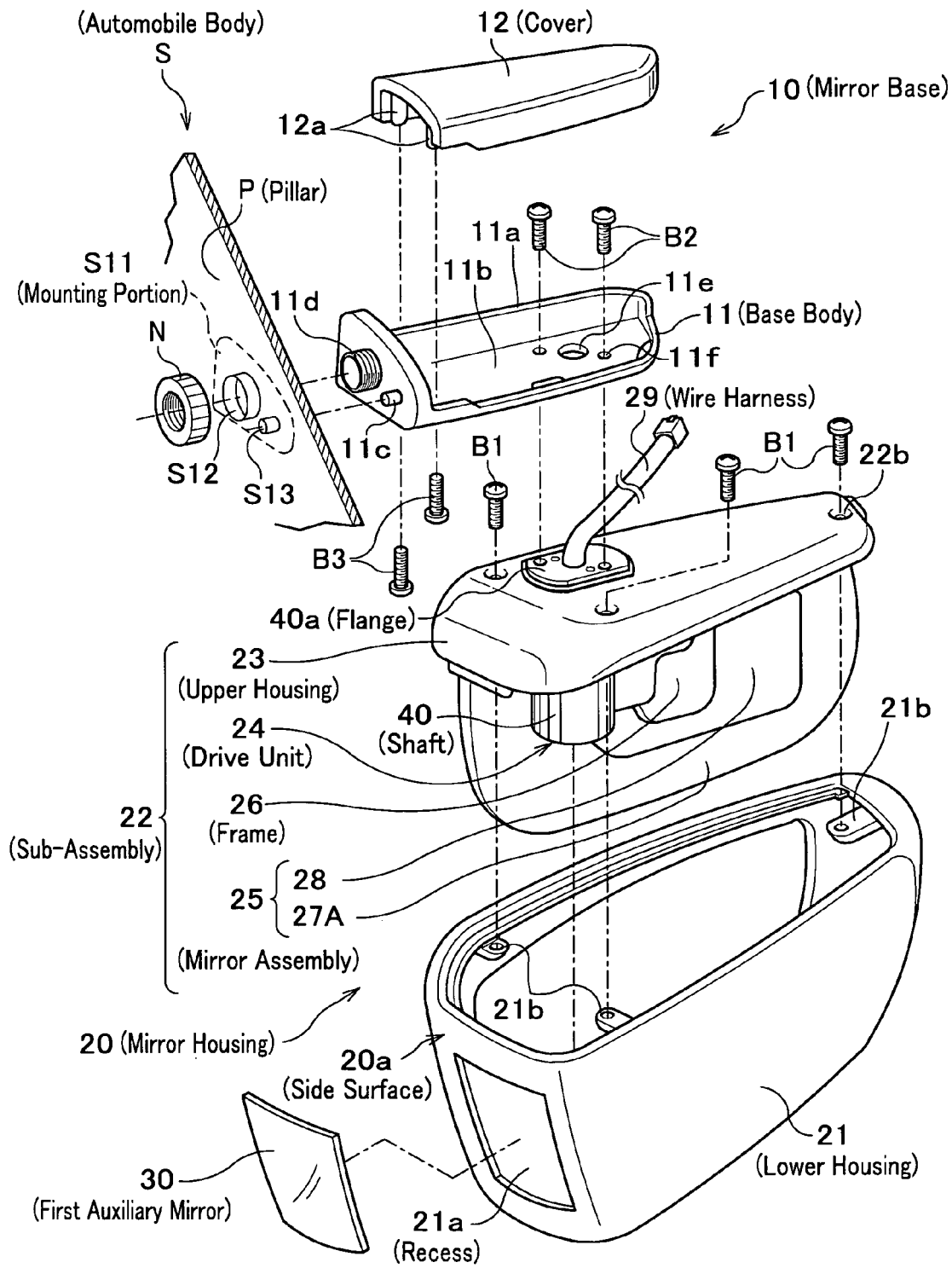
FIG. 3 is an exploded perspective drawing of an outer mirror according to the first embodiment.

The outer mirror according to the present invention is set to a shaft 40 (FIG. 3) fixed under the mirror base 10 with rotation motion capability. The mirror housing 20 can be reset into a housing position by an electric motor. FIG. 3 shows such electric housing outer mirror however the present invention is not confined in such housing system, but a manual reset into housing can be adopted.

A pair of the outer mirror according to the present invention is, as shown in FIG. 1, installed to the pillars P locating both periphery of the front window. However the installation position is not confined this position but a window pillar which constructs the front portion of the window frame of the side window SW and an acute angle potion C of the front portion of the side door S1.

The mirror base 10 in this embodiment is made of a plastic material and is fixed to a mounting portion S11. The mirror base 10 comprises a base body 11 which has a top opening upper ward and a cover 12 that covers such top.

The base body 11 is constructed with a base wall 11b and a side wall 11a standing from the base wall 11b. On the side wall 11a facing to the automobile body S, a position pin 11c and a screw cylinder 11d of which surface has a screw groove are formed. The base wall 11b has a harness hole 11e and a thread hole 11f are formed.

The cover 12 has a screw hole stand 12a. The cover 12 is placed on the top of the base body 11 and can be fixed to the base body by screw threads B3 screwed into the screw hole of the screw hole stands 12a.

The mirror housing 20 is fixed to the shaft 40 under the bottom portion of the mirror base 10. In the present embodiment, the mirror housing comprises a sub-assembly 22 and a lower mirror housing 21 which has open windows facing to the upper direction and the rear direction.

Figure 4:
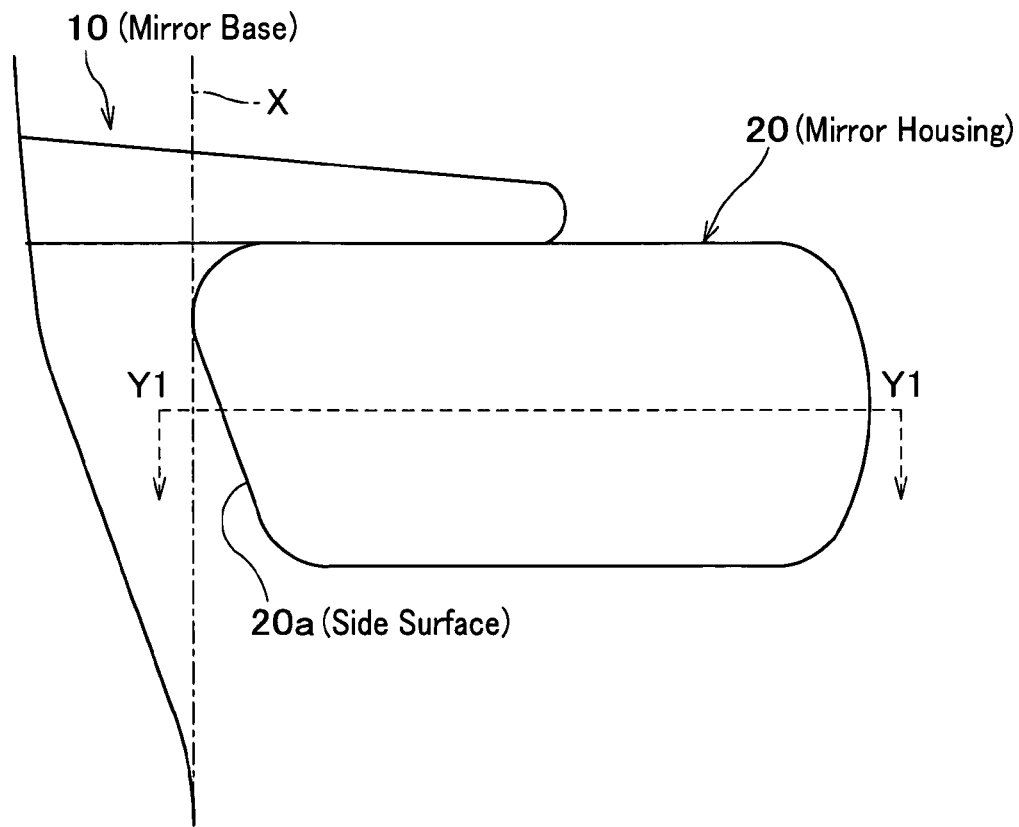
FIG. 4 is a front view of an outer mirror according to the first embodiment.

The mirror housing has a side surface 20a facing to the automobile body S. The side surface 20a is slanted against the vertical line X as shown in FIG. 4 and is slanted to the downward direction. The side surface 20a which is a wide wall of the lower mirror housing 21 has a recess 21a on the side surface.

As shown in FIG. 3, the sub-assembly 22 comprises an upper mirror housing 23, made of a plastic material, to which the upper window portion of the lower mirror housing 21b is fixed, a drive unit 24 to reset the mirror housing 20 into a housing position and set it to resume operation and a mirror assembly which is set in a frame 26. The mirror assembly 25 comprises the main mirror 27A to percept and monitor the rear side of the automobile and an actuator 28 that adjust the direction of the main mirror 27.

The drive unit 24 comprises an electric motor and a speed down gear set to the shaft 40. The motor driving force is transmitted to the shaft through the speed down gear. When the motor operates the mirror housing 20 rotates around the shaft 40. The operation for resetting the mirror housing 20 into the housing position and setting to resume operation can be controlled by changing the motor revolution direction. The actuator 28 has two motors; one for changing the upper and lower mirror direction and the other for left and right mirror direction of the main mirror 27A. By changing the revolution direction of the motors, the direction of the main mirror 27A can be adjusted.

A wire harness 29 that supplies the electricity to the drive unit 24 and the actuator 28 is set through a hole formed in the shaft 40. The wire harness 29 is set through the hole of the shaft 40 and comes out through the harness hole 11e to the inner room of the mirror base 10. The wire harness 29 finally comes out to the inside of the automobile body S through the hole formed in the screw cylinder 11d and connected to a control unit (not shown in the figures).

In order to fix the sub-assembly 22 to the lower mirror housing 21, the lower mirror housing 21 is covered by the sub-assembly 22 in an upward direction and screw threads B1 are screwed from the upper mirror housing 23 into fixing pieces 21b formed in the lower mirror housing 21.

The first auxiliary mirror 30 is formed in such a way that the reflection surface is mirror-coated on the head surface or the back surface of the glass substrate and attached into the recess 21a with an adhesive. The first auxiliary mirror 30 can be a plain surface mirror or convex surface mirror as far as the front wheels and the surrounding area can be reflected to be seen. The surface curvature of the first auxiliary mirror 30 is not necessary to be spherical but may continuously vary to have a viewing coverage to meet the requirement. The angle of the first auxiliary mirror is set that the driver can see the front wheels, the road surface and thereabout. For such setting of the first auxiliary mirror, the driver adjusts the setting angle of the first auxiliary mirror so that he or she can see the curb stones E on the mirror surface of the fist auxiliary mirror 30 when he or she drives the automobile in a sideway approaching to the curb of the road. In this embodiment, the side surface 20a of the mirror housing 20 declines against the vertical line X and therefore the mirror surface of the first auxiliary mirror can show the front wheels area when the mirror is attached to fit to the side surface 20a of the mirror housing 20.

Figure 5:
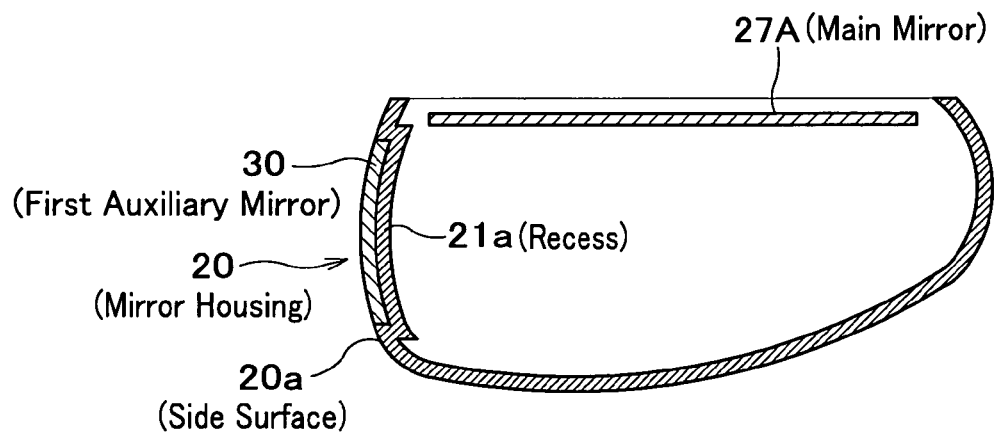
FIG. 5 is a cross sectional drawing that shows a view cut in a line Y1—Y1.

It is preferable that the mirror surface of the first auxiliary mirror has a co-surface with the mirror housing surface at the periphery of the recess 21a as shown in FIG. 5. Then a smooth air flow is kept for the air passing through the separation distance between the automobile body S and the mirror housing 20 and the air turbulence by the outer mirror is suppressed so that the window disturbing noise is less generated.

It is preferable that the first auxiliary mirror 30 has a coated surface so that a functional film is formed on the surface to maintain perception and monitoring capability. For example, a hydrophilic film layer consisting of silica layer and a titanium layer is formed on the mirror surface, the water and drips on the surface of the first auxiliary mirror diffuse to a film so that the perception and monitoring capability of the mirror can be maintained in the rainy weather. On the other hand, repellent layer is formed on the surface of the first auxiliary mirror, and then the water drips on the mirror surface are dropped away. It can be possible to maintain the visual sight of the first auxiliary mirror even in the rainy weather.

Figure 6:
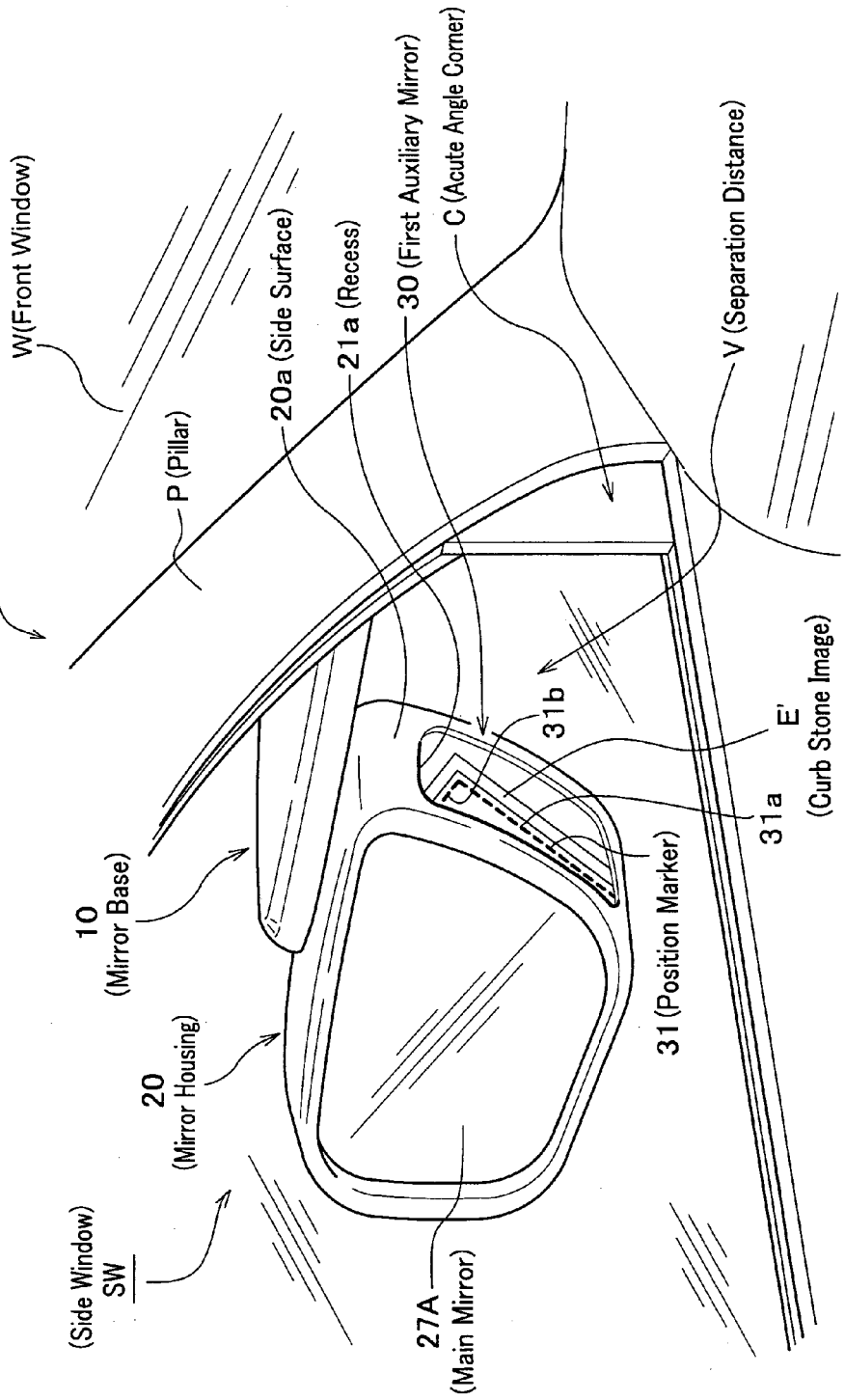
FIG. 6 is a schematic that shows an enlarged view of FIG. 2.
Figure 7:
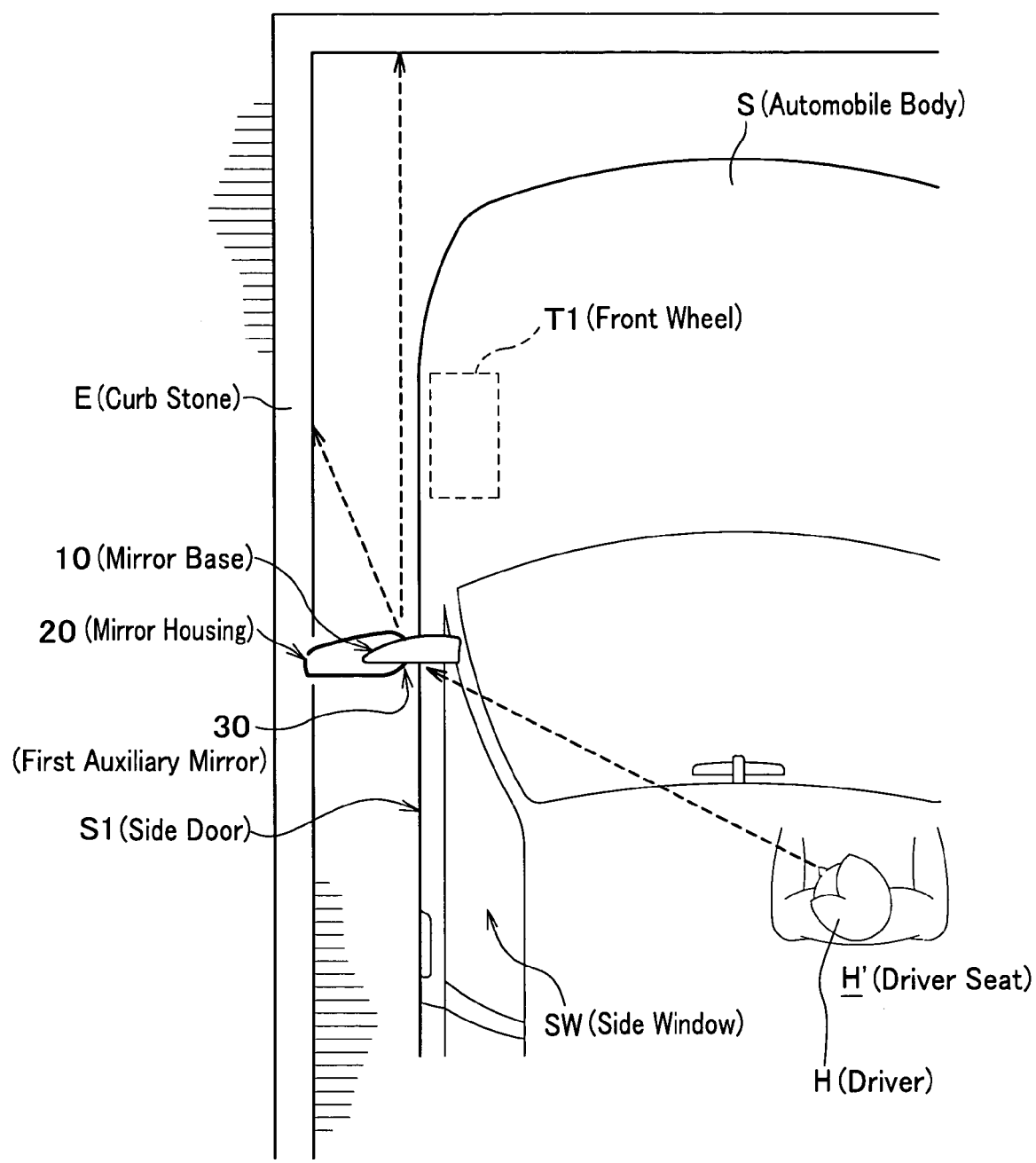
FIG. 7 is a schematic that shows an upper view of the viewing range of the first auxiliary mirror.
Figure 8:
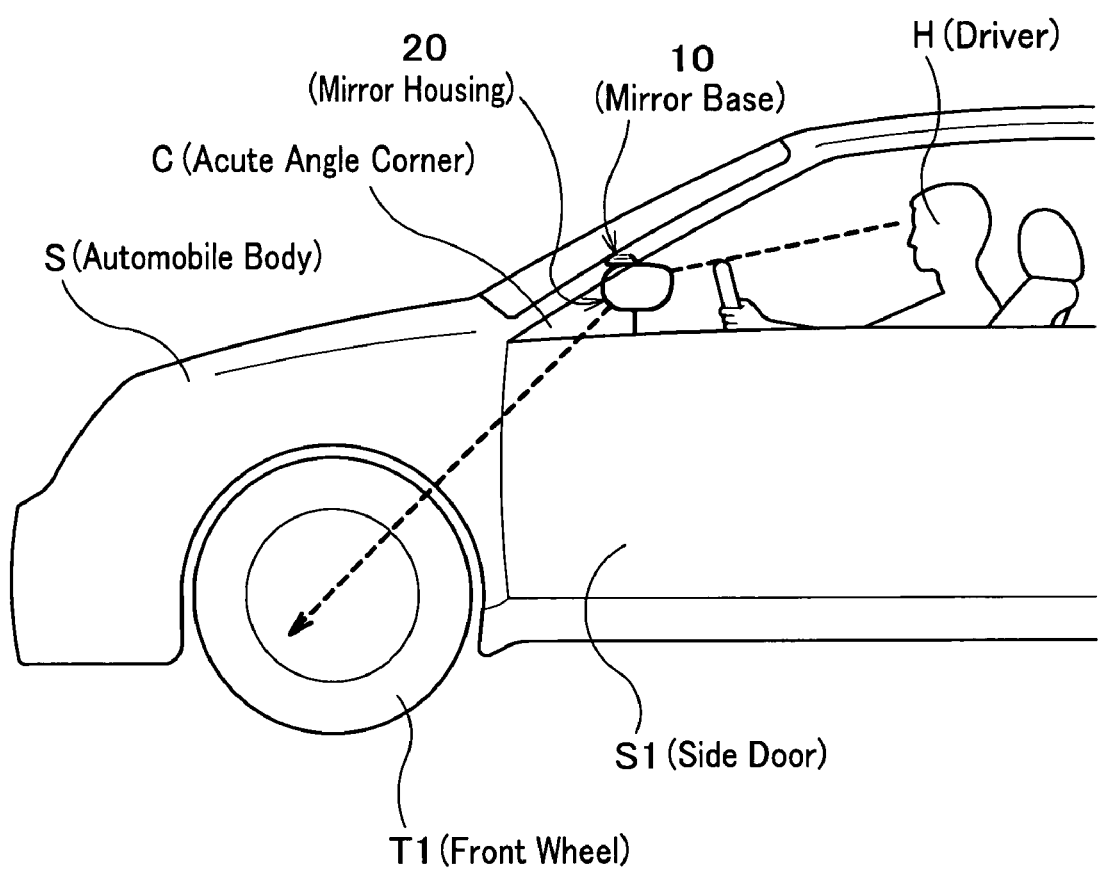
FIG. 8 is a schematic that shows a side view of the viewing range of the first auxiliary mirror.

As shown in FIG. 6, a position marker 31 is labeled on the surface of the first auxiliary mirror 30. The driver can confirm the relative position of the automobile against the road even no image of the automobile body S is directly reflected to the driver. The position marker 31 is preferred to show a few centimeter or tens of centimeters outside the Automobile body S. For example, when the driver drives the automobile approaching in a sideway closely to curb stones E (see FIG. 7), the automobile is driven in a sideway direction to the curb stone E and the image of the curb stone E' in the mirror coincides with the position marker 31 then the automobile body S is a few centimeters or tens centimeters apart from the automobile body.

If the position marker 31 can emit lights by using fluorescent paint or a light emitting diode, the driver can surely seen the position marker and he or she can confirm the relative position of the automobile in the night or in the dark place.

The position marker 31 is shown in FIG. 6, where the portion of the position marker as noted by a sign 31a indicates the peripheral edge of the automobile projected onto the road and that as noted by a sign 31b the peripheral edge of the bumper projected onto the road.

The position mark 31 is not confined into a straight line but round marks, star marks or arrow marks and can be colored on the surface of the first auxiliary mirror.

The assembling process of the outer mirror according to the embodiment of the present invention is explained by using FIG. 3.

The drive unit 24 is set onto the frame 26 and then the frame 26 is fixed to the upper housing 23 together with the mirror assembly 25 to construct the sub-assembly 22. The shaft 40 is fixed to the drive unit 24 and the wire harness is set out through out the shaft 40.

The lower portion of the sub-assembly 22 is covered by the lower housing 21 and the upper open window portion of the lower housing 21 positioned to the upper housing 23 is tightly assembled into a mirror housing 20 by using thread screw B1.

Then the first auxiliary mirror 21a is mounted onto the recess 21a with an adhesive.

The wire harness 29 is led out through a hole formed in the screw cylinder 11d made in the base body 11 and the cover 12 is place on the top portion of the base body 11. The cover 12 and the base body are assembled into a mirror base using screw threads B3 screwed from the bottom side of the base body.

The wire harness 29 which comes out from the hole formed in the screw cylinder 11d made in the base body 11 is led into the automobile body S and the screw cylinder 11d and the position pin 11c are inserted into a holding hole S12 and a position hole S13. The salient portion of the screw cylinder 11d coming through out the mounting portion S11 is fixed with a nut N and then mounting of the outer mirror to the automobile body has been completed.

The sideway approaching towards close up the curb stones in parking can be done by using the outer mirror according to this embodiment as a following example. The driver drives the automobile approaching to the curb stone in his or her destination in a reduced speed. Then he or she drives the automobile to approach the curb stone E with watching the first auxiliary mirror 30 with further slowed down speed. Once the curb stone E comes into the first auxiliary mirror, he or she returns the steering wheel to the straight forward position and stops the automobile at the time when the position mark 31 on the first auxiliary mirror 30 coincides with the image of the curb stone E' on the mirror. In addition, the automobile body S is reflected on the first auxiliary mirror, he or she can drive close to the curb stone with watching the automobile body S.

As explained above, the driver H can confirm the left front wheel and thereabout using the first auxiliary mirror 30, while the driver cannot confirm the left front wheel while sitting on the driver seat in the conventional technology.

Since the first auxiliary mirror 30 is attached to the side surface 20a of the mirror housing 20, no additional dead view is created in use of the first auxiliary mirror 30 though an auxiliary mirror attached to a main fender mirror block the driver view behind the auxiliary mirror. The first auxiliary mirror can alternate the conventional mirrors attached to the fender mirrors, therefore it is possible to reduce the quantity of the parts or components that results into cost down and into improving the apparent design but safety against the walking person is not effected though the auxiliary mirror attached to the main fender mirror may be dangerous due to increasing of the exposing components against the walking person.

Since the first auxiliary mirror 30 is set facing to obliquely downward, the head lamp lights of the oncoming automobiles do not come into the first auxiliary mirror 30 or are reflected on the mirror surface therefore the sight view of the driver is not intruded.

Figure 2:
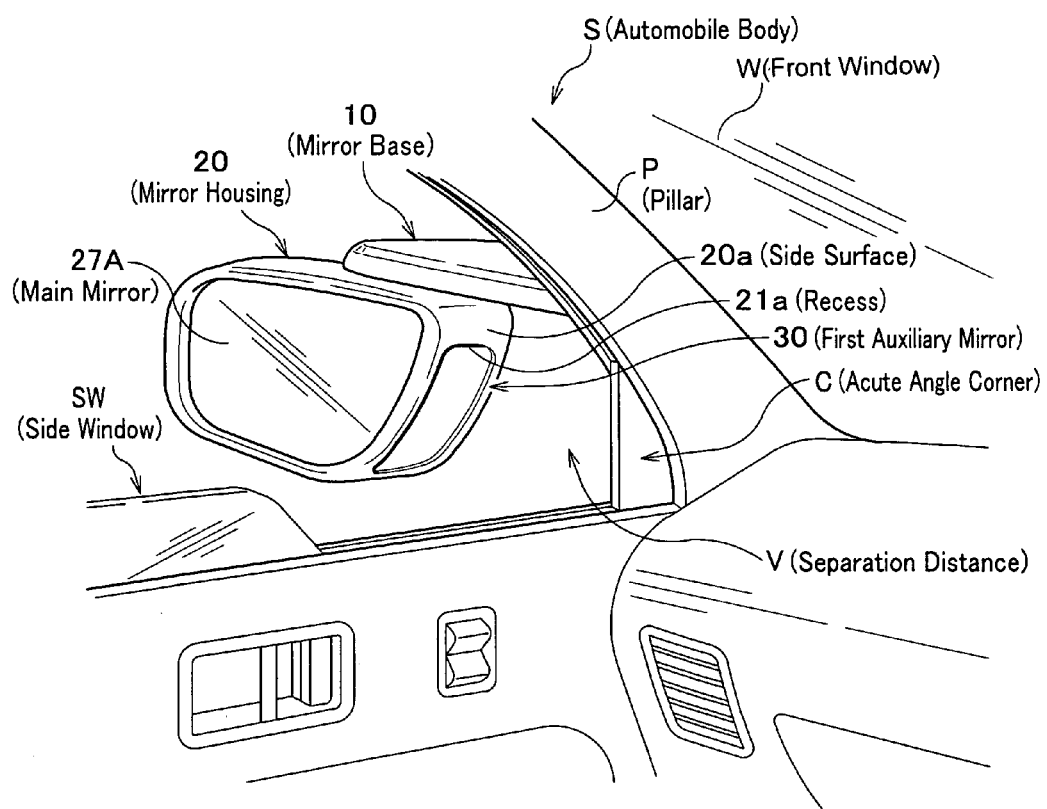
FIG. 2 is a schematic of a perspective view that shows the outer mirror of the first embodiment attached to the left side of the automobile seen from the driver seat.

Since the conventional outer mirror has a mirror base under the mirror housing, the auxiliary mirror attached to the side of the mirror housing provides a reflected view of the mirror base in the mirror. The range of visual perception resultantly becomes narrow. However the mirror base 10 according to the present invention has the construction such that the mirror base 10 locates in relatively upper position against the mirror housing 20 (as shown in FIG. 1) and the whole side surface 20a faces to the automobile body (as shown in FIG. 2). Therefore the mirror base 10 is not reflected in a way such that the first auxiliary mirror 30 attached to the side surface 20a does not reflect the image of the mirror base 10 in the mirror surface and can provide a wide range of area around the front wheel T1.

As shown in FIG. 1, the mirror housing 20 is suspended by the mirror base 10 thereunder with a separation distance against the automobile body S. All these construction can provide highly adaptive apparent design and can be fitted to various kinds of automobiles.

The separation distance V between the sides of the automobile and the mirror housing is kept in a certain distance, the air flow surrounding the automobile can be smoothly passed to the backside of the automobile. The air turbulence by the outer mirror is suppressed by this construction and the window disturbing noise is less generated.

The view provided by the first auxiliary mirror 30 can be changed by rotating the mirror housing 20.

In the present embodiment, the first auxiliary mirror is fixed to the side of the mirror housing 20 using an adhesive, however a construction such that the first auxiliary mirror has an adjustable angle is allowed.

Figure 9:
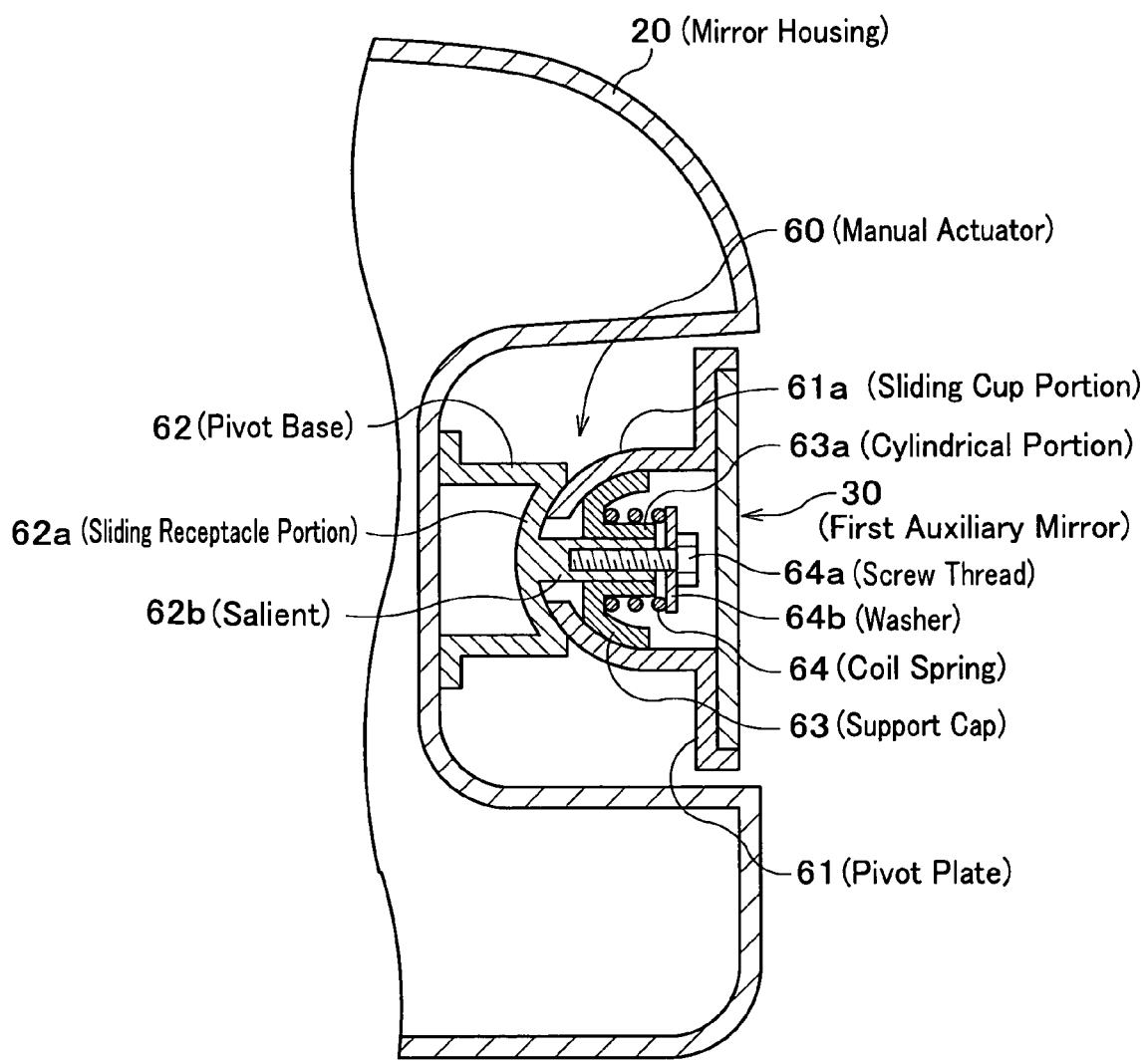
FIG. 9 is a cross sectional drawing that shows the construction of a manual actuator to adjust the setting angle of the first auxiliary mirror.

For example, a manual actuator 60 is set between the first auxiliary mirror 30 and the mirror housing 20 as shown in FIG. 9 and the setting angle of the first auxiliary mirror 30 can be manually adjusted.

The manual actuator 60 comprises a pivot plate 61 to which the first mirror 30 is attached and a pivot base formed in the mirror housing 20.

The pivot plate 61 has a sliding cup portion 61a at the portion facing to the pivot base 62. A sliding cup portion 61a has an external spherical shape against the pivot base however the central portion of the pivot top is cut.

The pivot base 62 has a sliding receptacle portion 62a that contacts with the sliding cup portion 61a of the pivot plate 61 and allows the angular movability of the pivot plate 61 and a salient 62b. The sliding receptacle portion 62a has an inner spherical shape and smoothly contacts with the sliding cup portion 61a. The pivot base can be formed together with the mirror housing 20.

A support cap 63 is set to push the inner surface of the sliding cup portion 61a of the pivot plate 61. The outer surface of the support cap 63 has a spherical shape and contacts to the inner surface of the sliding cup portion 61a. The support cap 63 has a cylindrical portion 63a to which the salient 62b of the pivot base 62 is inserted. The cylindrical portion 63a has a coil spring 64 externally inserted thereto. The salient 62b of the pivot base 62 has a screw thread 64a screwed-in on the top wherein the coil spring 64 is pushed by the washer 64b which is set by the screw thread 64a. The spring force of the coil spring 64 pushes the support cap 63 against the pivot base 62. As the result, the sliding cup portion 61a of the pivot plate 61 is pressed against the sliding receptacle portion 62a of the pivot base 62 in an appropriate force. In other words, the pivot plate 61 is sandwiched by the pivot base 62 and the support cap 63 and can move in angles at the center of the sliding cup portion 61a. The first auxiliary mirror 30 can be adjusted in the setting angle once the pivot plate 61 is manually changed in the angle so that it is possible to adjust the setting angle of the first auxiliary mirror for a better view in reflection.

Figure 10:
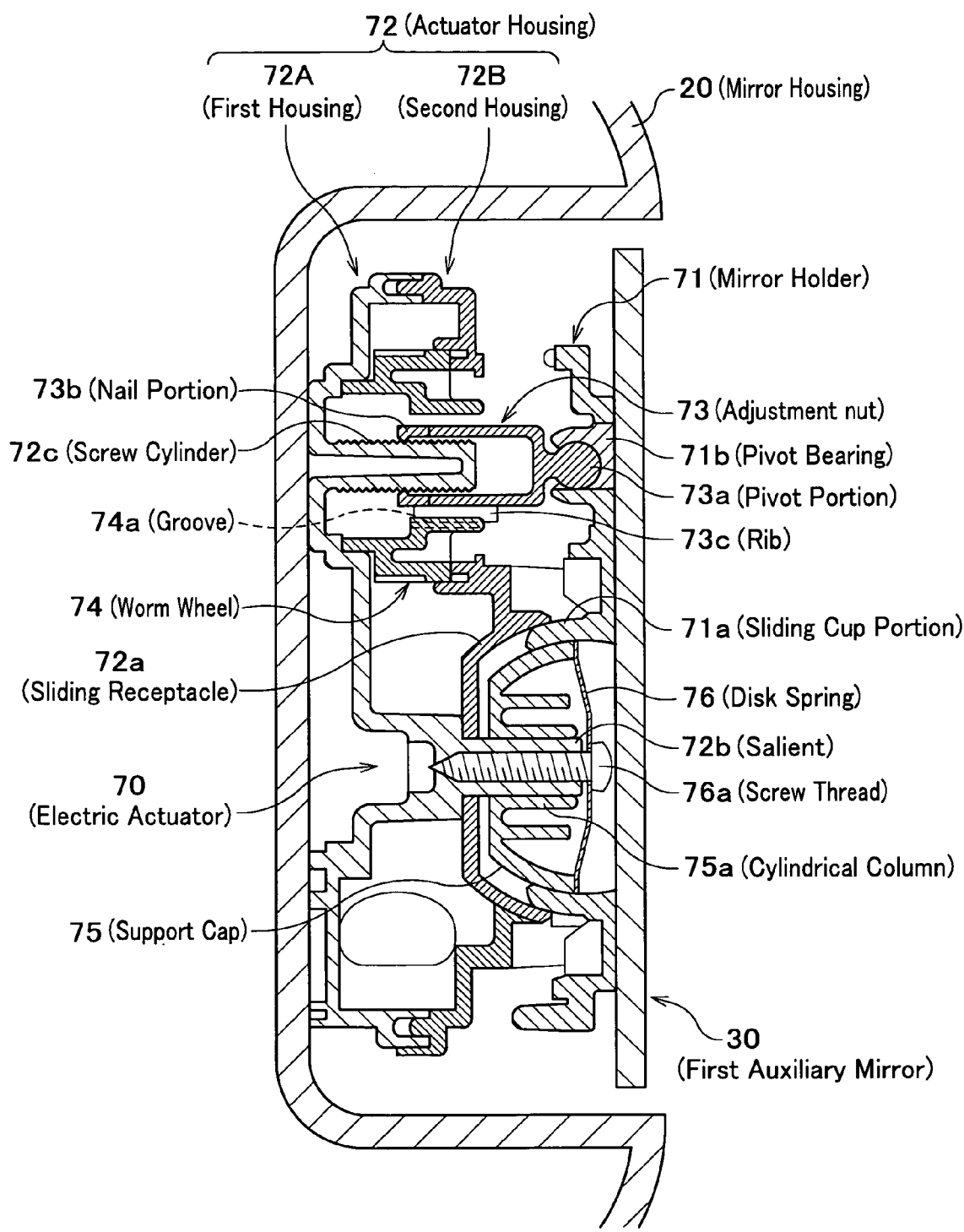
FIG. 10 is a cross sectional drawing that shows the construction of an electric actuator to adjust the setting angle of the first auxiliary mirror.

As shown in FIG. 10, it is possible to adjust the setting angle of the first auxiliary mirror 30 by means of the electric actuator 70 set between the fist auxiliary mirror 30 and the mirror housing 20 and the setting angle can be controlled by a remote controller in the driver cabin.

The electric actuator 70 comprises a mirror holder 71 that holds the first auxiliary mirror 30 from the back side, an actuator housing 72 that holds the mirror holder 71 in an arbitral setting angle and an adjust nut 73 set between the mirror holder 71 and the actuator housing 72.

The mirror holder 71 has a sliding cup portion 71a projecting to the actuator housing 72 and a pivot bearing 71b that has a concave shape to be fitted to the pivot portion 73a of the adjustment nut 73.

The actuator housing 72 comprises the first housing 72A which is fixed to the mirror housing 20 and the second housing 72B which is covered and fixed to the first housing 72A. A sliding receptacle 72a that supports the sliding cup portion 71a of the mirror holder 71 is formed in the second housing 72B. A salient 72b which fits to the center of the sliding receptacle 72a of the second housing 72B and screw cylinder 72c to which the nail portion 73b of the adjust nut 73 is screwed-in are formed against the mirror holder 71 in the first housing 72A. The sliding receptacle 72a of the second housing 72B has a spherical shape at the external surface and fits to the sliding cup 71a of the mirror holder 71.

A worm wheel 74 which has the center axis around the screw cylinder 72c of the first housing 72A is set in the actuator housing 72. A worm gear (not shown in the figure) that fits the outer gear of the worm wheel and an electric motor (not shown in the figure) that drives the worm gear in rotation are set in the actuator housing 72 as well. Grooves 74a that meet the ribs 73c formed on the surface of the adjust nuts in the same direction as that of the screw cylinder are formed in the inner surface the worm wheel.

The adjust nut 73 has a cylindrical shape having a dead end which is a pivot portion 73a fittable to the pivot bearing 71b of the mirror holder 71 and has a nail portion 73b which is screwed to the screw cylinder 72C of the first housing 72A. The adjust nut 73 has ribs on the outer surface so that the ribs 73c meets the grooves 74a formed in the worm wheel 74. Therefore the adjust nut 73 rotates in an axis around the screw cylinder 72c together with the worm wheel 74. Even the ribs 73c of the adjust nut 73 meets the grooves 74a of the worm wheel 74, the screw cylinder 72c is slidable to the screw cylinder direction (the rotational axis of the worm wheel 74). Since the nail portion 73b of the adjust nut 73 contacts the screw cylinder 72c in a screw fitting, the adjust nuts 73 can move toward the direction of the cylinder axis of the screw cylinder 73 in response to the revolution of the rotation.

The sliding cup 71a of the mirror holder 71 is pushed against the sliding receptacle 72a by a support cap 75. The outer surface of this support cap 75 has a spherical shape that fits to the inner surface of the sliding cup portion 71a of the mirror holder 71. At the center of the support cap 75, a cylindrical column 75a that can be inserted to the salient 72b of the first housing 72A is formed and the salient 72b is inserted thereto. A disk spring 76 covers the support cap 75. The disk spring 76 is pushed against the support cap 75 by a screw thread 76a which is screwed into the salient 72b of the first housing 72A. The support cap 75 is pushed to the direction of the actuator housing 72 by the spring force of the disk spring 76. As the result, the sliding cup 71a of the mirror holder 71 is pushed against the sliding receptacle 72a of the second housing 72B with an appropriate force. Therefore the mirror holder 71 can be held in a manner such that it can slide under sliding surfaces of the second housing 72B and the support cap 75 and be changed in the setting angle to be in an appropriate angle.

When the motor is driven and rotates the worm wheel 74, then the adjust nut 73 is rotated around the screw cylinder 72c and the adjust nut 73 moves to the direction of the screw cylinder 72c. Since the sliding cup portion 71a is held in a slidable manner, the mirror holder 71 declines with the center of the salient 72b of the first housing 72A in accordance with the shift of the adjust nut 73. In other words, it is possible to direct the first auxiliary mirror 30 for appropriate mirror viewing.

Second Embodiment

Figure 11:
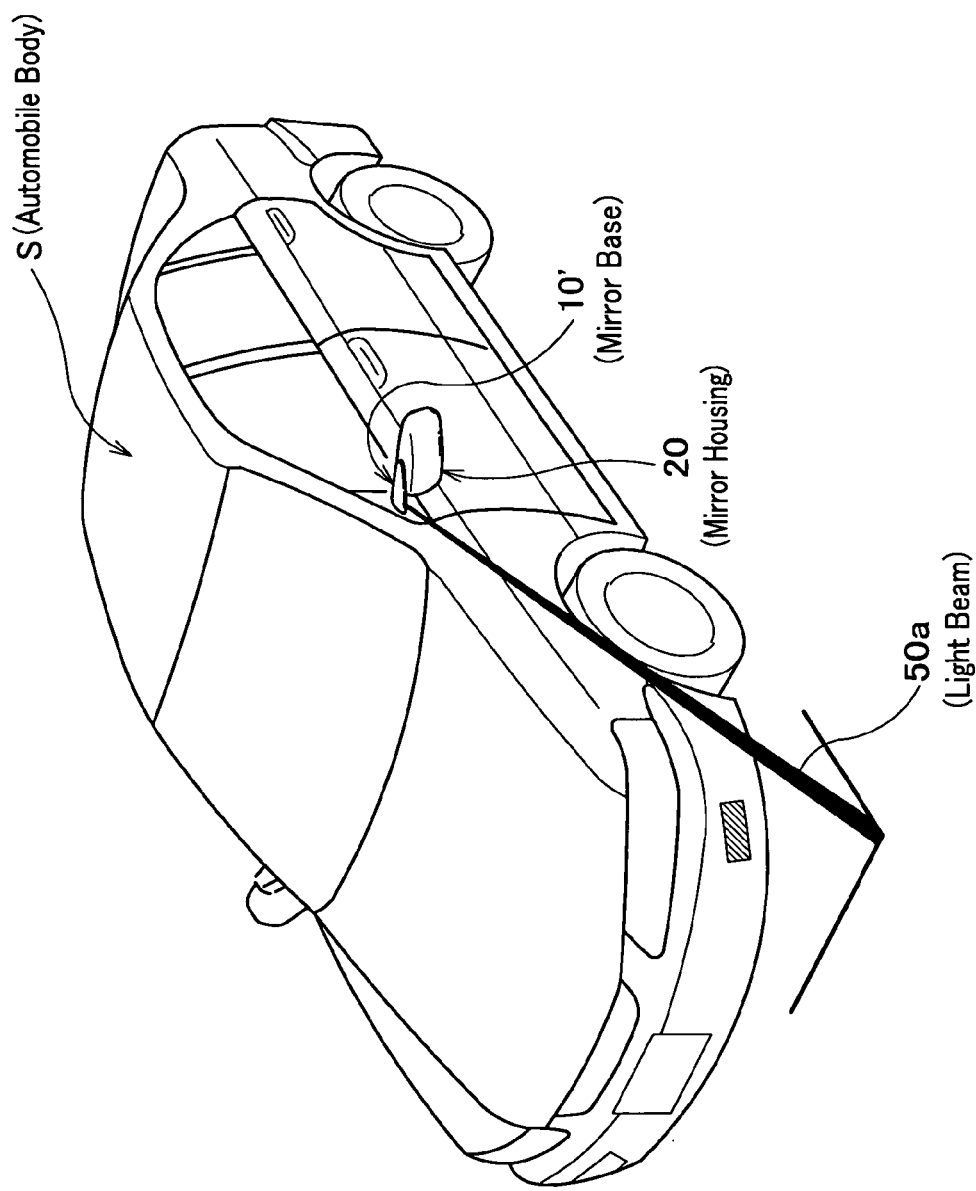
FIG. 11 is a schematic that shows an implementation of an outer mirror according to the second embodiment.
Figure 12:
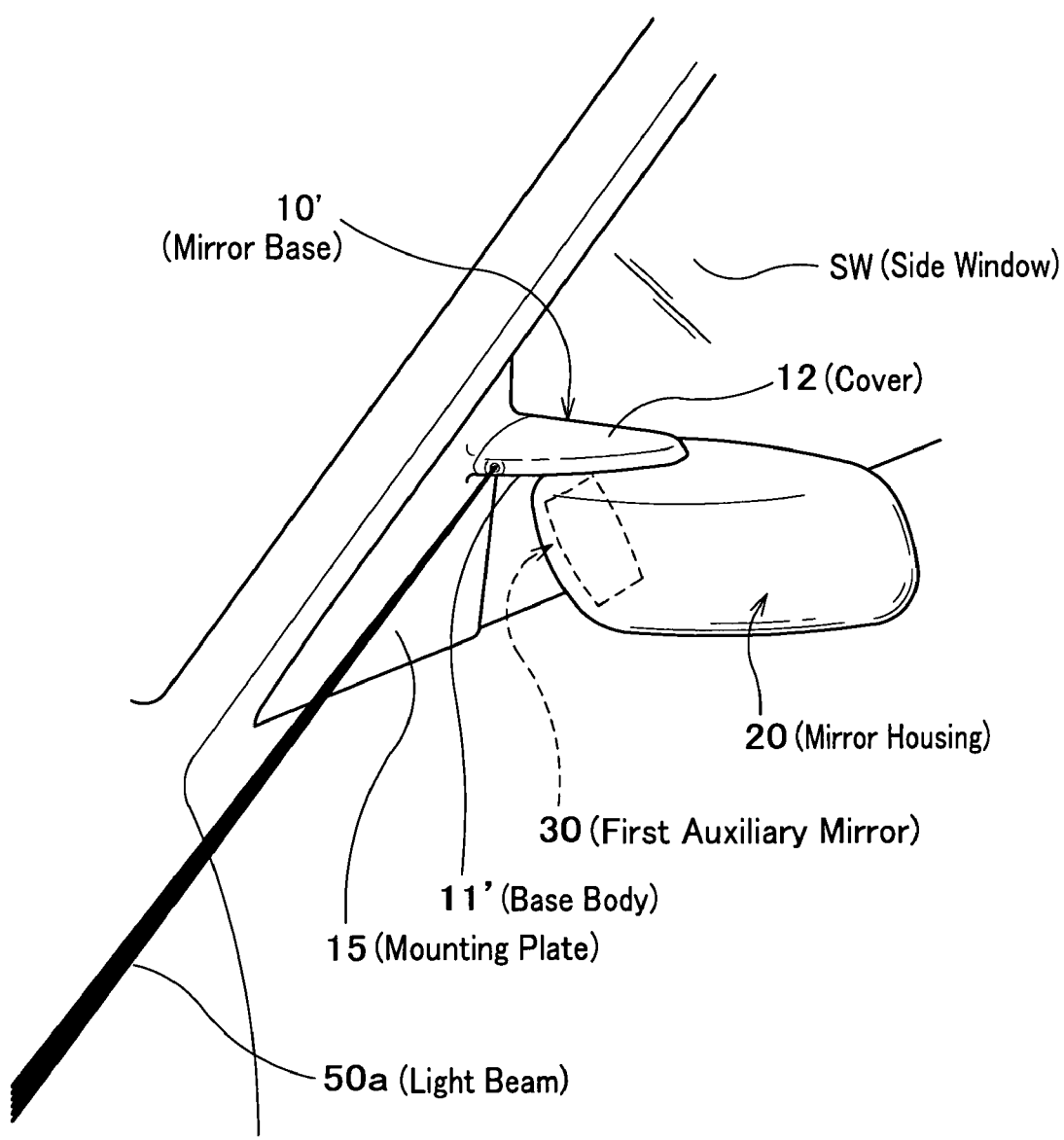
FIG. 12 is a schematic that shows an enlarged view FIG. 11.
Figure 13:
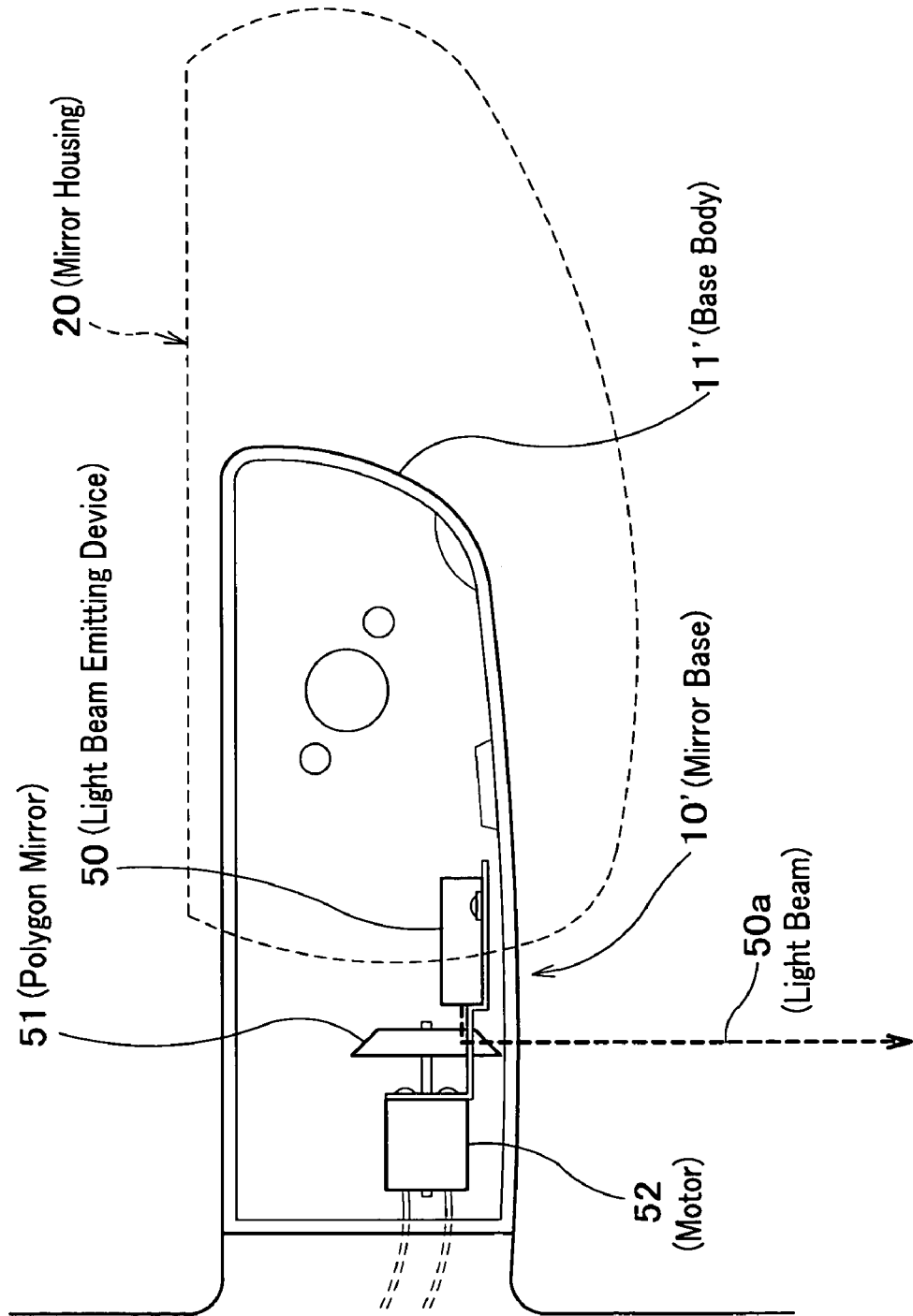
FIG. 13 is an installation drawing of a light beam emitting device in a mirror base.

The outer mirror according to the second embodiment of the present invention features, as shown in FIG. 11 and FIG. 12, that the mirror base includes a light beam emitting device 50 (as shown in FIG. 13) that projects a converged light beam such as a laser beam, white LED light, etc.

The light beam emitting device 50 projects a light beam 50a and illuminates the area aside from the automobile, which can be monitored by the first auxiliary mirror.

The constructions of the mirror housing 20 and the first auxiliary mirror 30 are same as those of the outer mirror showed for the fist embodiment. However the installation of the outer mirror according to the present embodiment is different such that the mirror base 10' is installed to an acute angle corner C at the front end of the side window SW. As shown in FIG. 12, the mirror base 10' for the present embodiment comprises a base body which is formed into a unified molded body with a mounting plate 15 which has a substantially triangle shape and a cover 12 which covers the top of the base body 11'. By fixing the mounting plate 15 onto the acute angle corner C of the side window SW, the installation of the outer is carried out.

The light beam emitting device 50 is fixed in the base body 11' of the mirror base 10' as shown in FIG. 13. A polygon mirror 51 is used for the light emitting part of the light beam emitting device 50. The polygon mirror 51 is rotated by a motor 52 of which rotation shaft is set to the center of the polygon mirror, therefore the polygon mirror rotates in a constant speed once the motor rotates in a constant rotation speed.

The beam light 50a emitted from the light beam emitting device 50 is reflected by the mirror surface of the polygon mirror 51 and projected to the road area around the front wheel. Since the light beam 50a is projected from the mirror base 10' which is close to the automobile body S, the light beam emitting device 50 illuminates the peripheral area of the automobile.

Since the illuminated area by the light beam 50a locates from a certain consistent distance from the automobile body S, the relative distance from the automobile body S does not depend on the area illuminated by the light beam 50a which can be monitored by means of the first auxiliary mirror 50 for the driver whoever he or she is. For example, when the driver drives the automobile approaching in the sideway close to curb stones, he or she can drive the automobile consistently close to the curb stones with a certain consistent distance from the curb stones regardless to whoever the driver is once he or she stops the automobile in such a way that the light beam 50a hits the curb stones viewed on the first auxiliary mirror 30. Since the roads or the curb stones are illuminated by "a light", the driver can confirm the relative position of the automobile even in the night or in the dark places.

Third Embodiment

Figure 14:
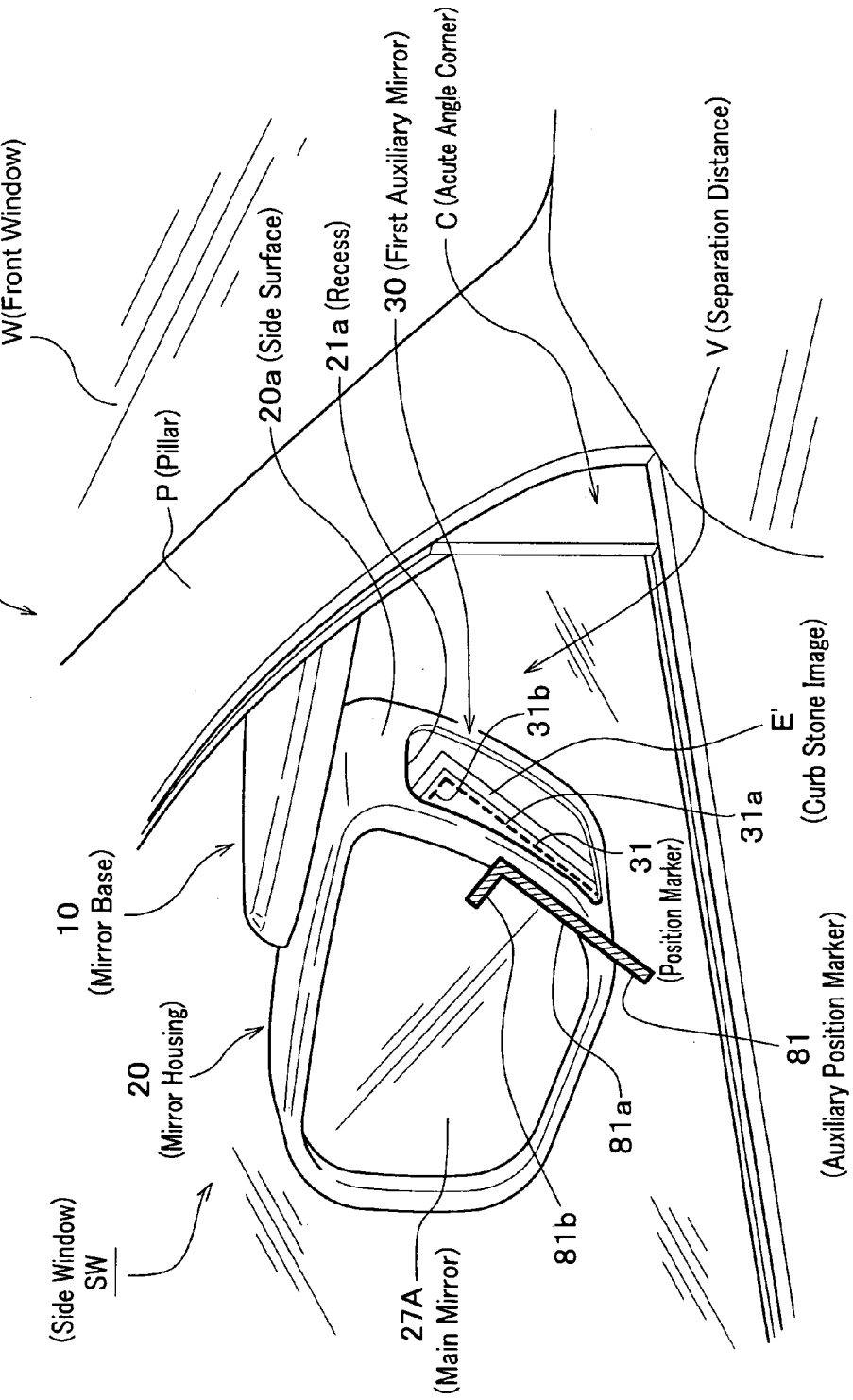
FIG. 14 is a perspective drawing that shows an outer mirror according to the third embodiment.

The outer mirror according to the third embodiment of the present invention has a position marker 81 on the side window SW as shown in FIG. 14.

An auxiliary position marker 81 is put on the side window SW, locating between the first auxiliary mirror 30 and the driver seat H', at the position corresponding to the position marker 31 labeled on the surface of the first auxiliary mirror 30. The mark piece 81a in the auxiliary position mark 81 corresponds to the side line of the automobile side and the mark piece 81b corresponds to the front line of the automobile.

There is an appropriate position onto which the auxiliary position marker 81 depending on the driver's eye position, however it is possible to exploit the standard human body shape for the driver as the standard reference. For the determination of the position of the auxiliary marker 81 is done in such a way that the driver who has a standard body size monitors the first auxiliary mirror 30 and the position marker 31 coincides with the auxiliary position marker 81.

The auxiliary position mark 81 is not confined into a straight line but round marks, star marks or arrow marks and can be a translucent on the surface of the first auxiliary mirror not to intrude in the mirror view for the driver. A paint of a translucent color may be used so that the marking of the side window SW does not intrude in the sight view of the driver.

Figure 15:
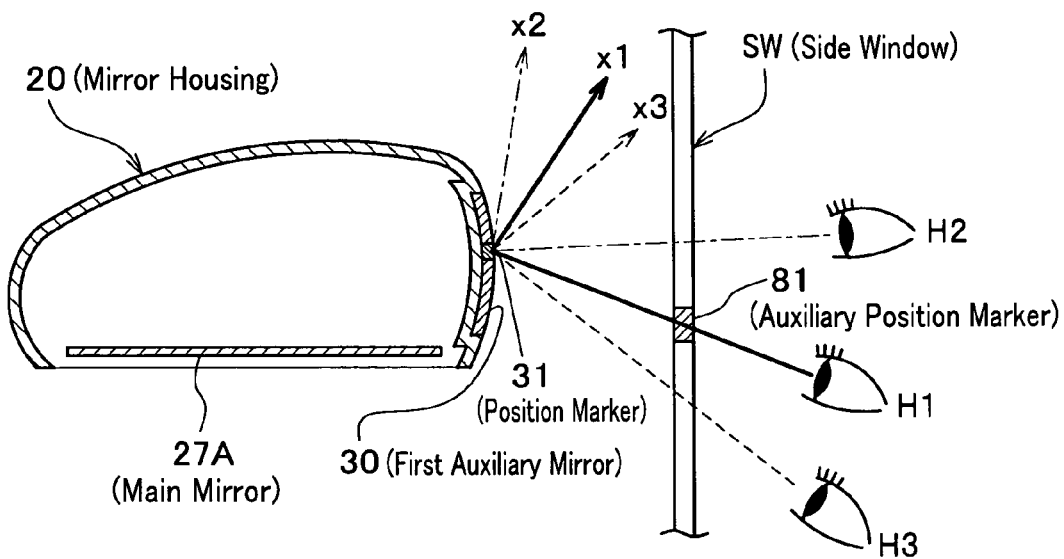
FIG. 15 is a schematic that shows the viewing function of the first auxiliary mirror.

Once the driver watches the first auxiliary mirror 30 in a way that the position marker 31 on the first auxiliary mirror 30 coincides with the auxiliary marker 81, the position corresponding to the position marker 31 has a constant relative distance from the side of the automobile body S regardless to the driver. As shown in FIG. 15, the viewing directions x1, x2 and x3 on the first auxiliary mirror is different by the difference of the position of the driver's eye H1, H2 and H3. Therefore once the drivers only use the position marker 31, the position of the automobile S monitored on the fist auxiliary mirror differs by the drivers. However, once the position marker 31 coincides with the auxiliary position marker 81 by changing the sight direction of the drivers, the direction is correctly selected and the position of the automobile S monitored on the fist auxiliary mirror is determined constant whoever the driver is. Once driver shifts his or her view sight H2 and H3 so that the position marker 31 coincides with an auxiliary position marker 81, then he or she monitors the first auxiliary mirror 30 from the position of the H1 and the viewing direction x1 is aligned for his or her sight direction.

For instance, when the driver drives the automobile in a sideway close to the curb, the distance between the automobile body S and the curb stones differs from a driver to a driver as far as he or she uses only the position marker 31. On the other hand, he or she shifts his or her view sight so that the position marker 31 coincides with an auxiliary position marker 81 and he or she drives the automobile while he or she is monitoring the first auxiliary mirror 30 in a manner that the curb stone image E' coincides with the position marker 31 (therefore the auxiliary position marker 81). Then he or she can always park the automobile body S in a certain consistent distance from the curb stones whoever he or she is.

By using a fluorescent paint for the auxiliary position marker 81, the auxiliary position marker 81 can be self lighting, then the parking the automobile with a constant distance between the automobile body S and the curb stones is surely done in the night or in the dark places.

The present embodiment is not confined into the condition as shown in FIG. 14 such that only one single position marker 31 and only one single auxiliary marker 81 are used. But plural position markers and plural auxiliary markers may be used for support the plural peoples who have different human body sizes. The position of the auxiliary position marker is not limited to the side window SW as far as it locates between the first auxiliary mirror 30 and the drive. The auxiliary position marker installed in the side door S1 may be used as shown in FIG. 14.

This auxiliary position marker 91 is made in a form of a rod which is installed in a stand S15 which is locates on the outer side of the side door S1. The auxiliary position marker 91 is in a mechanism (not shown in the figures) that can reset it back into the stand S15. Therefore it is possible that the auxiliary position marker 91 pops up when the driver check the position using the first auxiliary mirror 30 and pops down into the stand S15 otherwise. By using this mechanism, the auxiliary position marker is not always seen and has a little effect against the apparent design of the automobile body S. The pop down design of the auxiliary position marker prevent the damage from the mischief.

The pop up and pop down mechanism of the auxiliary position marker 91 (such as the auxiliary position marker is set in a rod which comes out from and goes down to a stand, respectively) can be designed to be a manual mechanism or a motor drive mechanism which is installed in the stand S15 and which is remote-controlled by the driver sitting in the driver cabin.

Painting a fluorescent paint onto the rod of the auxiliary position marker 91 or setting a light emitting device such as a light emitting diode facilitates the driver to surely see the auxiliary position marker 91 and therefore he or she can drive the automobile in an appropriate position in the night or in the dark place.

In all of the above embodiments, the mirror base 10, the lower housing 21 and the upper housing 23 are made of a plastic material, but they may be made of a metal.

In all of the embodiments described above, the outer mirror has a construction such that the mirror housing 20 is attached to the shaft 40 fixed to the bottom of the mirror base 10 with rotation capability (as shown in FIG. 3). The fixing design of the mirror housing to the mirror base is not limited to the mechanism shown in FIG. 3. The outer mirror construction such that a shaft that is set to the mirror base but can rotate against the mirror base may be used for another embodiment. In order to reset this type of outer mirror into the housing position, a drive unit that set the outer mirror back into a housing position and resume for operation is set in the mirror base.

Fourth Embodiment

The outer mirror according to the fourth embodiment features that the mirror base 10 has the second auxiliary mirror that directs to a tilted angle to the side of the automobile so that the rear side of the automobile can be monitored.

The second auxiliary mirror 35 is made in such a way that a reflecting film is formed on the front surface or the back surface of the glass substrate and is attached to the recess formed on the side surface 10a of the mirror base 10 with an adhesive. The surface of the second auxiliary mirror 35 is not only a planer surface but a part of a spherical one as far as the second auxiliary mirror 35 provides the view of the road area close to the rear wheels T2 (see FIG. 1) that is a oblique lower direction of the automobile body, and the mirror curvature may continuously (or in a step manner) vary to have a viewing coverage to meet the requirement such that a curvature of the convex surface can be 600 mm to 1,000 mm in a preferable condition. The setting angle of the second auxiliary mirror 35 is to show a view of the real wheel and thereabout. Therefore, the curb stones E can be monitored on the second auxiliary mirror 35 by preferably adjusting the direction of the mirror.

Figure 19:
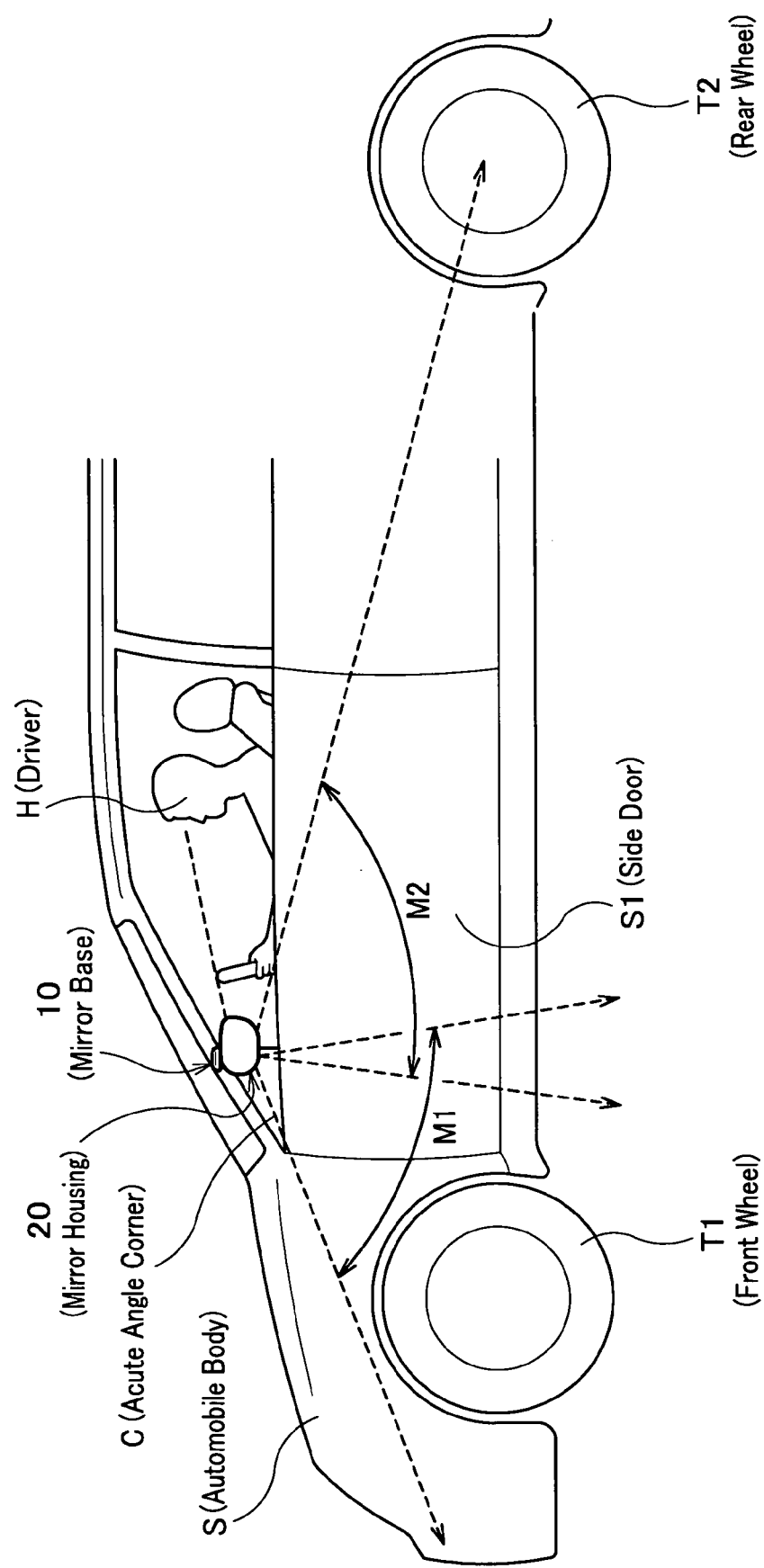
FIG. 19 is a schematic that shows a side view of the viewing range of the second auxiliary mirror.

A preferable usage of the second auxiliary mirror 35 is as shown in FIG. 19 that the area M2 that the driver percepts and monitors by using the second auxiliary mirror 35 is partly overlapped with the area M1 that by using the first auxiliary mirror 30. Then it is possible to easily and continuously percept and monitor the front wheel T1 to the rear wheel T2.

By setting the second auxiliary mirror 35 attached on the side surface 10a in the mirror base 10 to face the rear side for of the automobile side surface, it is possible to percept and monitor the rear wheel T2 and thereabout. Since there is a separation distance V between the automobile body S and the mirror housing 20, it is possible to monitor the area of the real wheel T2 in a wide range by using the second auxiliary mirror 35.

Since the second auxiliary mirror 35 is facing obliquely downward, the light emitted by the head lamps of the oncoming cars is not directly reflected to the driver eyes by the second auxiliary mirror 35.

A mechanism to adjust the setting angle of the second auxiliary mirror 35 can be adopted in such a way that the mechanism using a manual actuator 60 as shown in FIG. 9 or an electric actuator as shown in FIG. 10, can be installed in the mirror base. Then it is possible to adjust the setting angle f the second auxiliary mirror 35 to be adjusted for an appropriate direction.

It may be preferable that the functional film is formed on the surface of the second auxiliary mirror 35 in order to maintain the perception and monitoring capability of the secondary auxiliary mirror 35. An example of the functional films is a hydrophilic film that consists of the silica layer and the titanium layer, and then the water and rain drips over the mirror surface are diffused in a film form and it is possible to maintain the visual sight of the second auxiliary mirror even in the rainy weather. Another example of the functional films is a repellent film, and then the water and rain drips over the mirror surface are hydrofuged into water drops. Then, it is possible to maintain the visual sight of the second auxiliary mirror even in the rainy weather.

Figure 17:
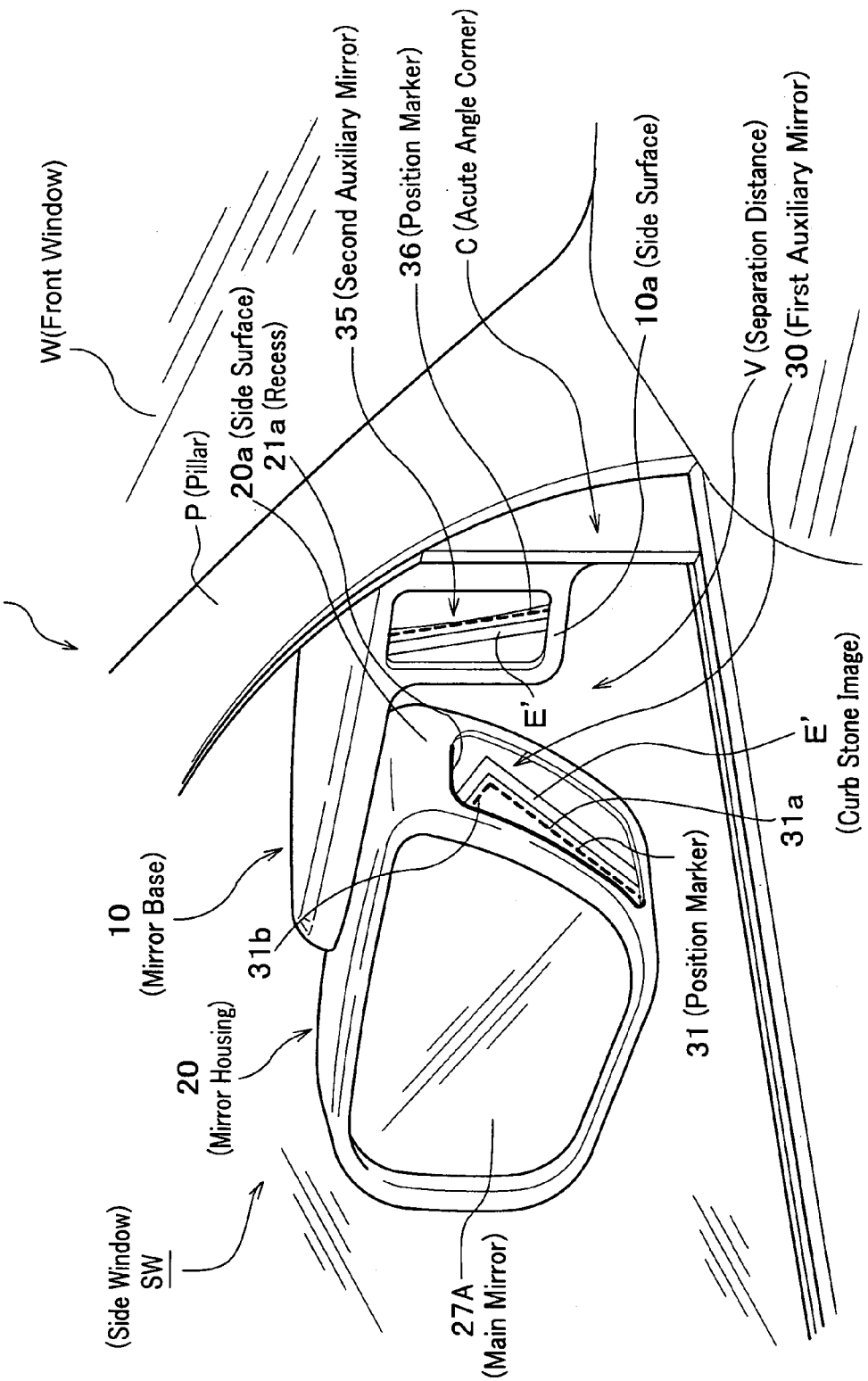
FIG. 17 is a perspective drawing that shows an outer mirror according to the fourth embodiment.
Figure 18:
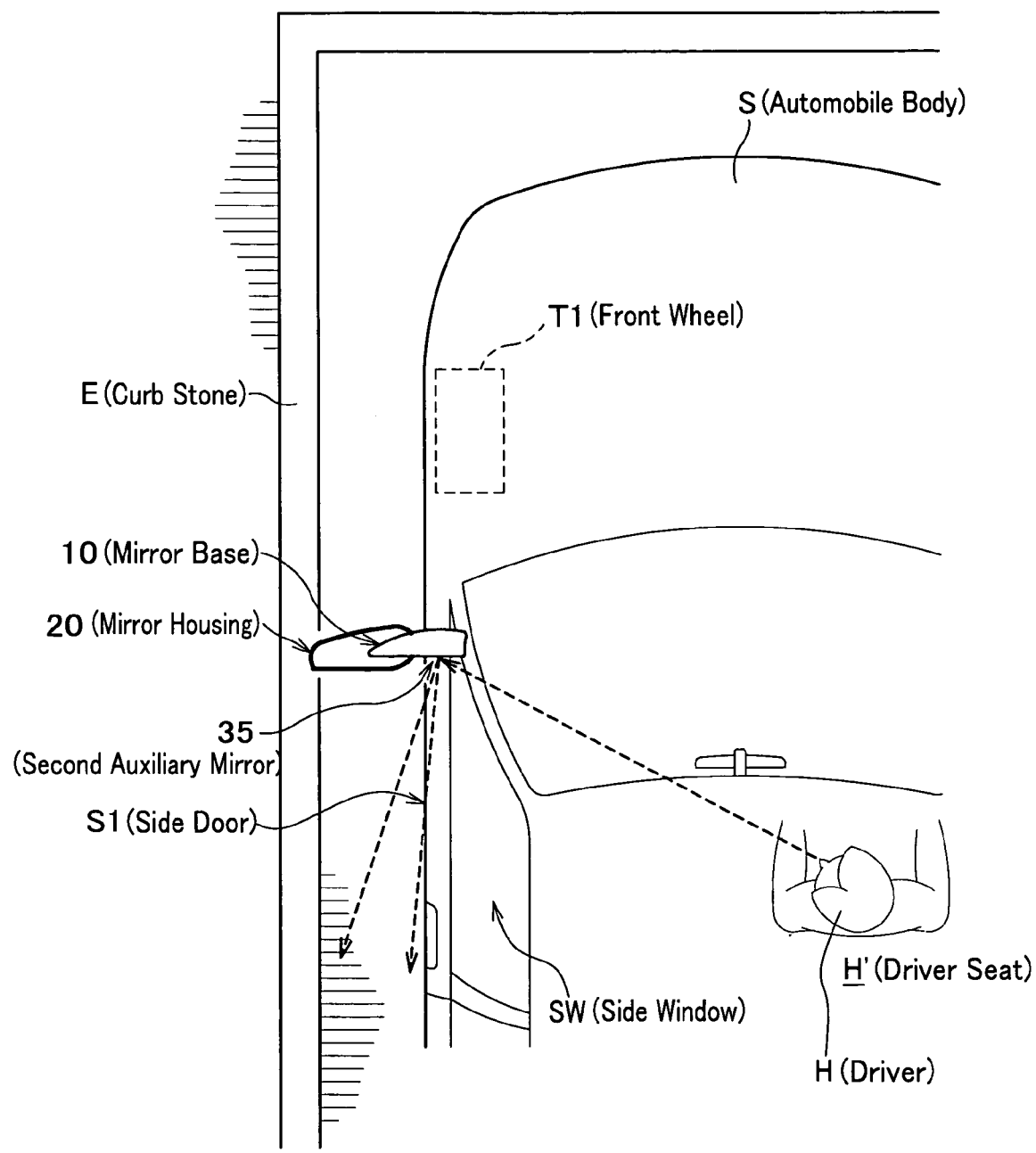
FIG. 18 is a schematic that shows an upper view of the viewing range of the second auxiliary mirror.

As shown in FIG. 17, a position marker 36 that shows the relative location of the automobile is formed on the surface of the second auxiliary mirror 35. By using this position marker, it is possible to grasp the relative location of the automobile against the road even no image of the automobile body is viewed on the secondary auxiliary mirror. It is preferred that the position marker 36 shows several centimeter and several tens of centimeters outer area. For example, when the driver drives the automobile (automobile body S) in a sideway close to the curb stones E (see FIG. 18), the automobile is driven to stop at the position such that the image E' of the curb stone E overlaps with the position marker 36 and then there is a gap of several centimeters and several tens of centimeters between the automobile body S and the curb stone E.

Moreover, if the position marker 31 can emit lights by using fluorescent paint or light emitting diode, the driver can surely see the position marker and he or she can confirm the relative position of the automobile in the night or in the dark place.

The position mark 36 is not confined into a straight line but round marks, star marks or arrow marks and can be colored on the surface of the second auxiliary mirror 35.

Figure 16:
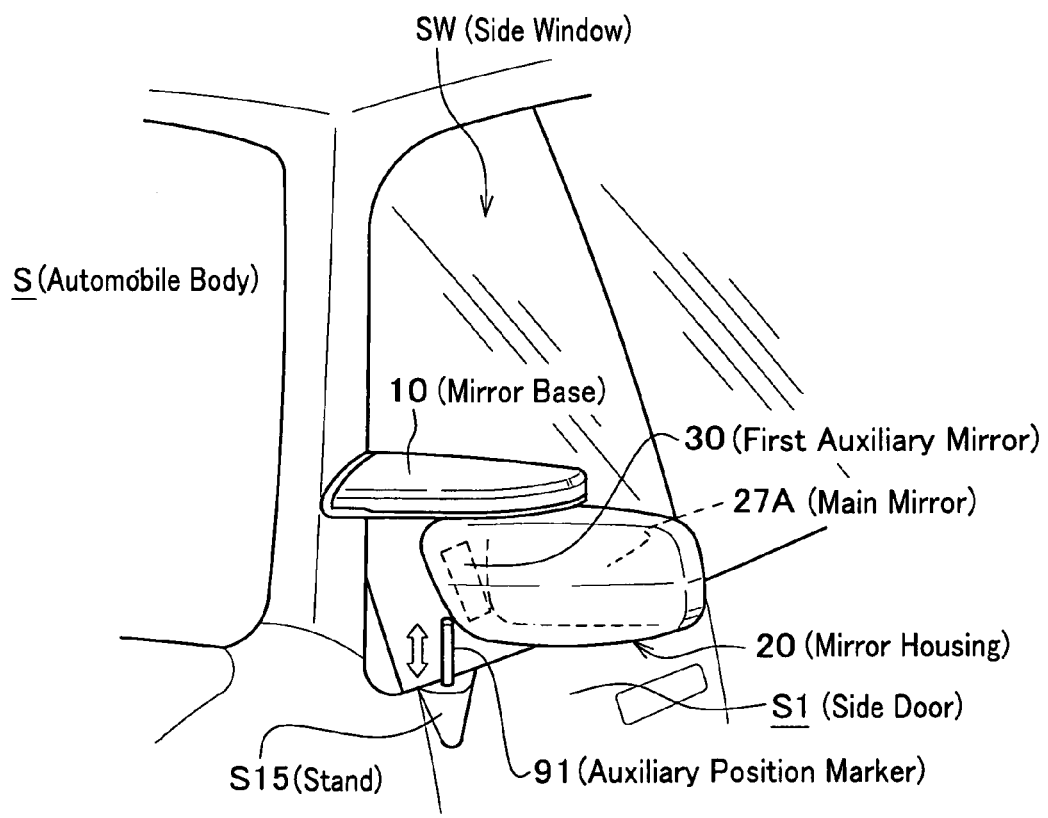
FIG. 16 is a perspective drawing that shows an example of the auxiliary position marker.

Being similar to the auxiliary position marker 81 (see FIG. 14), an auxiliary position marker is attached to the side window SW, which is between the second auxiliary mirror 35 and the driver H', more specifically at the location that corresponds to the position marker 36 attached onto the second auxiliary mirror. Also as being similar to the auxiliary position marker 91 (see FIG. 16), a mechanism such as the auxiliary position marker that can be popped up from a side door for use can be installed in the side door S1. Being further similar to the third embodiment, painting a fluorescent paint onto the rod of the auxiliary position marker 91 or setting a light emitting device such as a light emitting diode facilitates the driver to surely see the auxiliary position marker 91 and therefore he or she can drive the automobile in an appropriate position in the night or in the dark place.

Being similar to the second embodiment, it is preferred that a light beam emitting device (not shown in the figures) is installed in the mirror base 10 so that the light beam emitting device illuminates the area aside from the automobile, which can be monitored by the second auxiliary mirror 35.

The present embodiment shows an outer mirror that has a first auxiliary mirror 30 and a second auxiliary mirror 35, but a configuration such that only the second auxiliary mirror 35 is included may be allowed.

Fifth Embodiment

Figure 20:
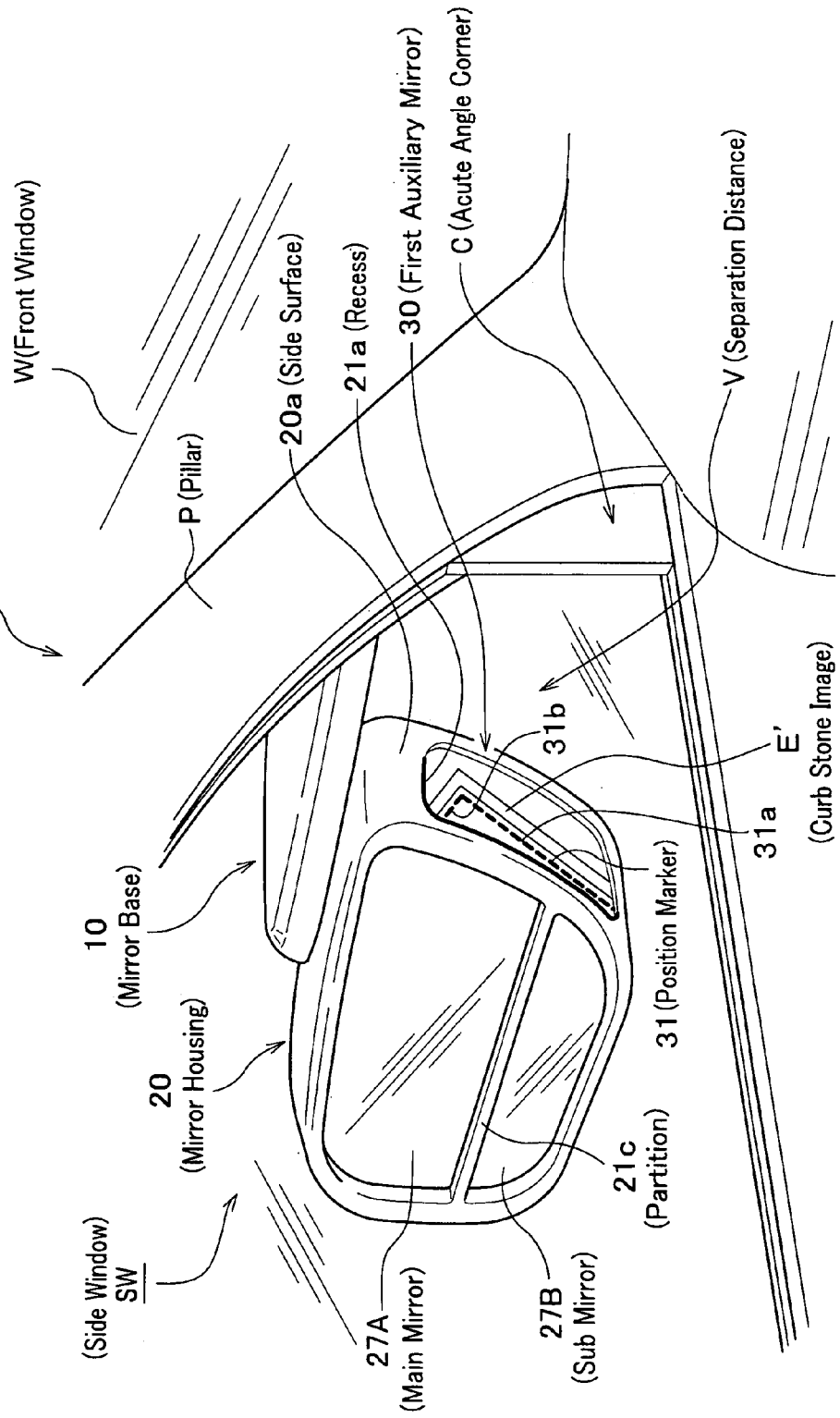
FIG. 20 is an exploded perspective drawing that shows an outer mirror according to the fifth embodiment.

As shown in FIG. 20, the outer mirror according to the fifth embodiment features that the mirror housing has a sub mirror 27B in the lower potion of the open window of rear side, wherein the sub mirror 27B is partitioned from and below the main mirror 27A by a partition 21c.

The sub mirror 27B is formed in such a way that the reflection surface is mirror-coated on the head surface or the back surface of the glass substrate and attached to the lower part from the partition 21c of the mirror housing. The surface of the sub mirror 27B is not only a planer surface but a part of a spherical one as far as the view of the road area close to the rear wheels (see FIG. 1) that is an oblique lower direction of the automobile body. It is preferred that a curvature of the convex surface can be 100 mm to 600 mm. The setting angle of the sub mirror 27b is adjusted so as to show the view of the rear wheel T2 from the driver seat. Therefore, the curb stones can be seen in the mirror when the driver drives the automobile in a sideway close to the curb stones.

The partition 21c is formed in a unified body with the lower housing 21 (see FIG. 3) and the sub mirror 27B is fixed in the frame formed by the partition 21c and the open window edge of the lower housing 21.

Figure 21:
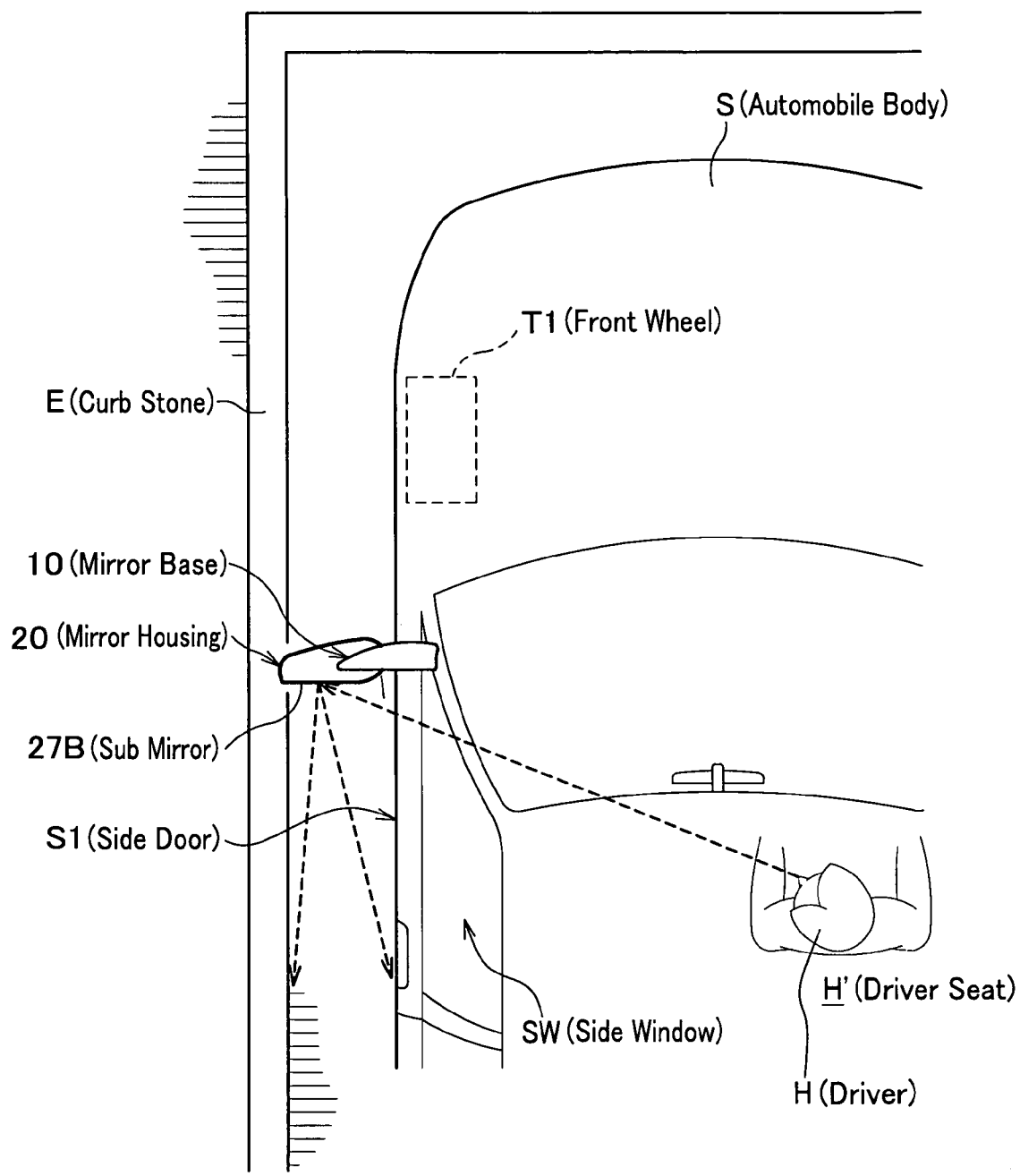
FIG. 21 is a schematic that shows an upper view of the viewing range of the sub mirror according to the fifth embodiment.
Figure 22:
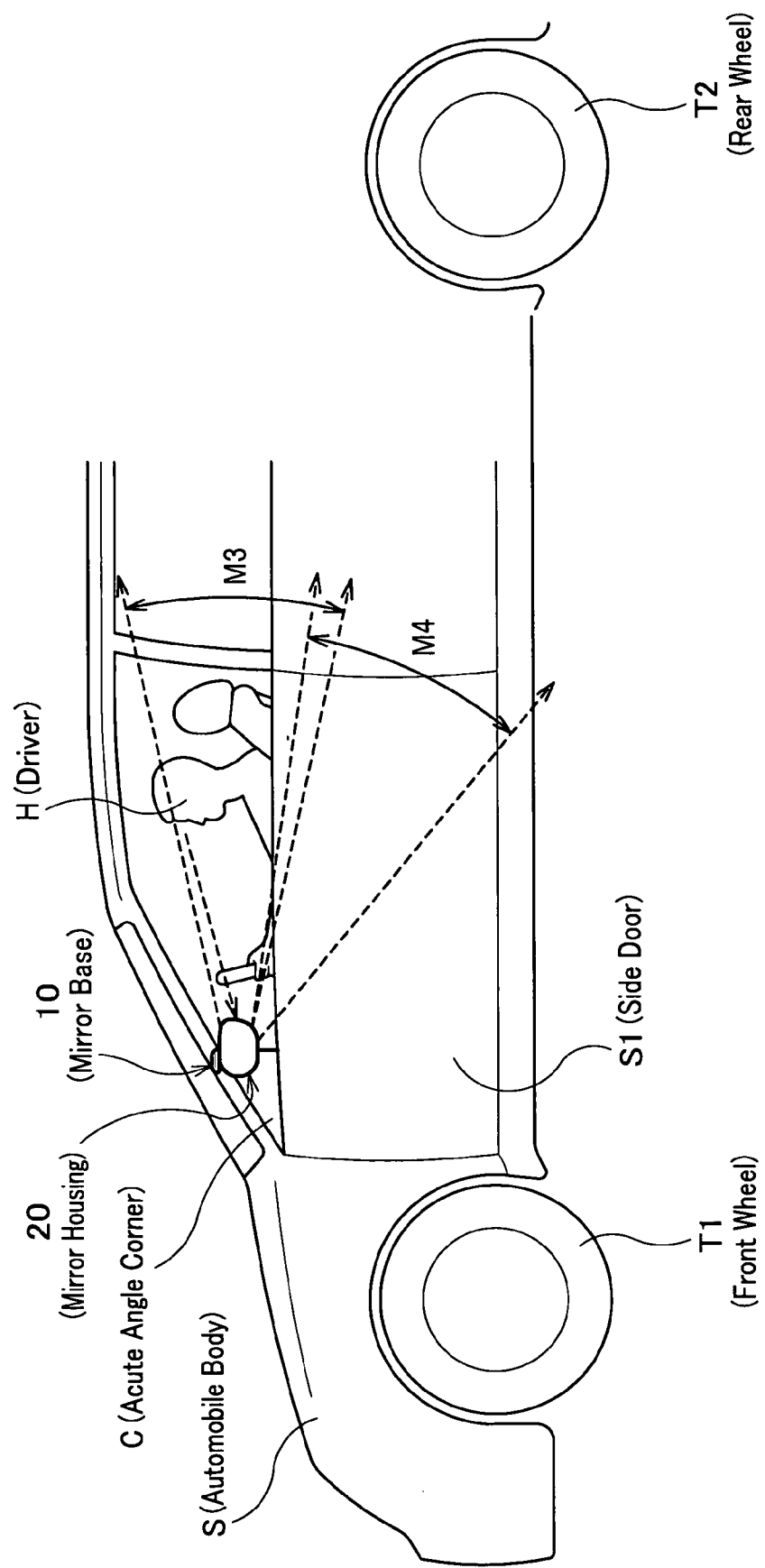
FIG. 22 is a schematic that shows a side view of the viewing range of the sub mirror according to the fifth embodiment.

By adding the sub mirror 27B to the main mirror 27A that supports the perception and monitoring of chasing or coming up automobiles in the rear side, the sub mirror supports the perception and monitoring of the rear wheel T2 and thereabout, as shown in FIG. 21 and FIG. 22. Since the sub mirror 27B is attached in adjacent to the main mirror 27A, it is possible to monitor the rear wheel T2 and thereabout and the chasing or coming up automobiles in the rear side at a glance without a lack of the rear views.

Since the sub mirror 27B is set facing obliquely downward, the head lamp lights of the oncoming automobiles cars is not directly reflected on the mirror surface of the sub mirror 27B towards the driver and therefore the sight view of the driver is not intruded.

As shown in FIG. 22, it is preferred to partly overlap the viewing range M4 by the sub mirror 27B and the other viewing range M3 by the main mirror 27B. Then it is possible to percept and monitor around the rear wheels T2 and chasing or coming up automobiles at the same time without lacking of the rear views.

Since there is a partition 21c between the main mirror 27A and the sub mirror 27B, it is not necessary to keep the continuously varying curvature of mirror at the boarder line to the partition 21c and it is possible to design the curvature specific to the main mirror 27A and the sub mirror 27B so that a wider view of perception and monitoring is obtained.

In the present embodiment explained above, the sub mirror 27B is fixed to the mirror housing 20, however a mechanism to adjust the setting angle of the sub mirror 27B is allowed. For example, by using the manual actuator 60 as shown in FIG. 9 and the electric actuator 70 as shown in FIG. 10 for the installation of the sub mirror 27B to the mirror housing 20 (not shown in the figures), it is possible to manually or electrically adjust the setting angle of the sub mirror 27B.

In case that the coverage of the perception and monitoring using the main mirror 27A and the sub mirror 27B is predetermined, it is further preferred that the main mirror 27A and the sub mirror 27B are held in a single mirror holder. The setting angle of the mirrors can be adjusted by a single actuator 28 (as shown in FIG. 3). In other words, the setting angle can be simultaneously adjusted for the main mirror 27A and the sub mirror 27B. The partition can be formed in the mirror holder in a manner of a unified body.

It may be preferable that the functional film is formed on the surface of the sub mirror 27B in order to maintain the perception and monitoring capability of the sub mirror 27B. An example of the functional films is a hydrophilic film that consists of the silica layer and the titanium layer, and then the water and rain drips over the mirror surface are diffused in a film form and it is possible to maintain the visual sight of the sub mirror 27B even in the rainy weather. Another example of the functional films is a repellent film, and then the water and rain drips over the mirror surface are hydrofuged into water drops. Then, it is possible to maintain the visual sight of the sub mirror even in the rainy weather.

The present embodiment shows an outer mirror that has a first auxiliary mirror 30 and a sub mirror 27B, but a configuration such that only the sub mirror 27B is included may be allowed.

Sixth Embodiment

Figure 23:
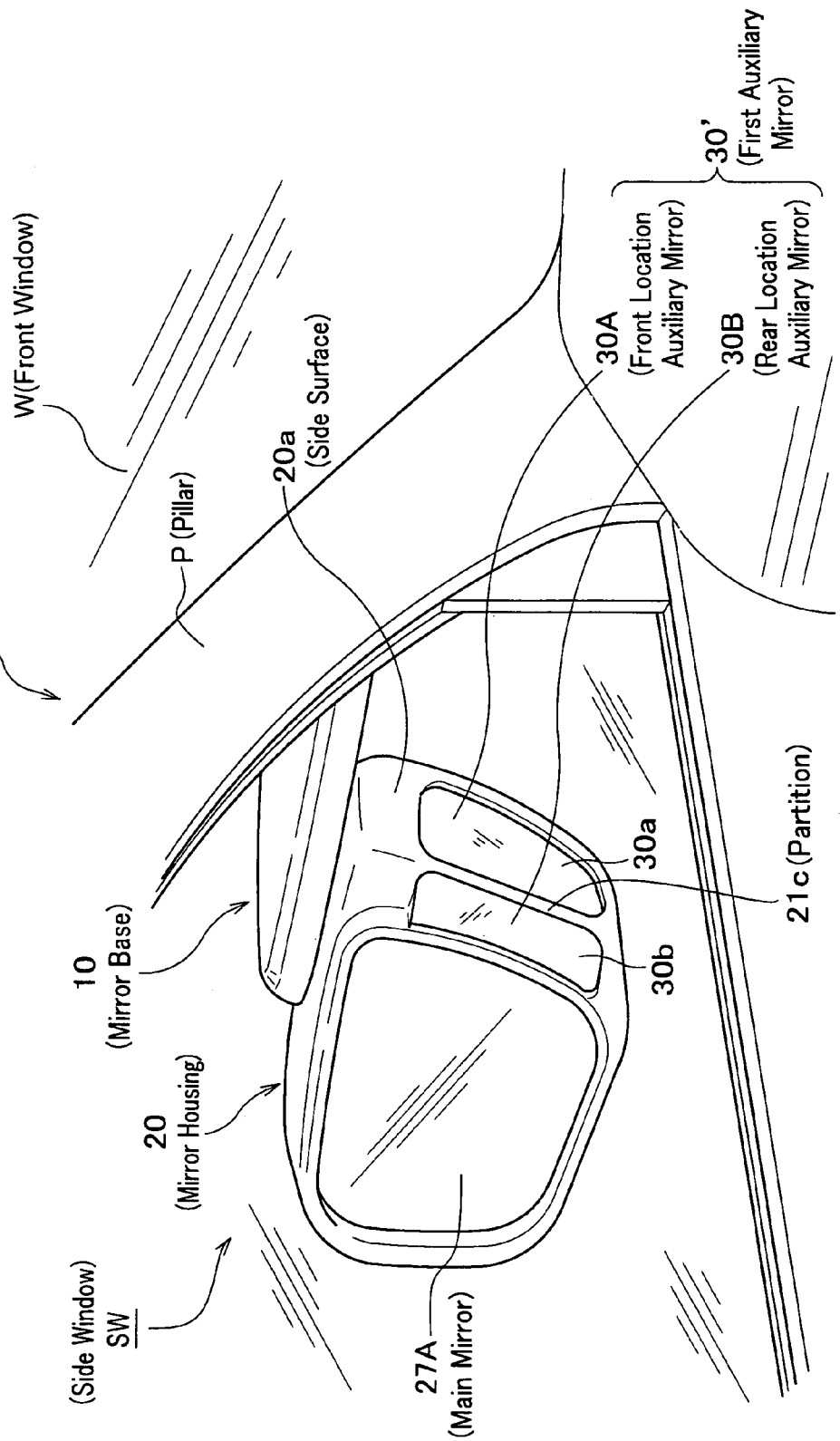
FIG. 23 is a perspective drawing that shows an outer mirror according to the sixth embodiment.
Figure 24:
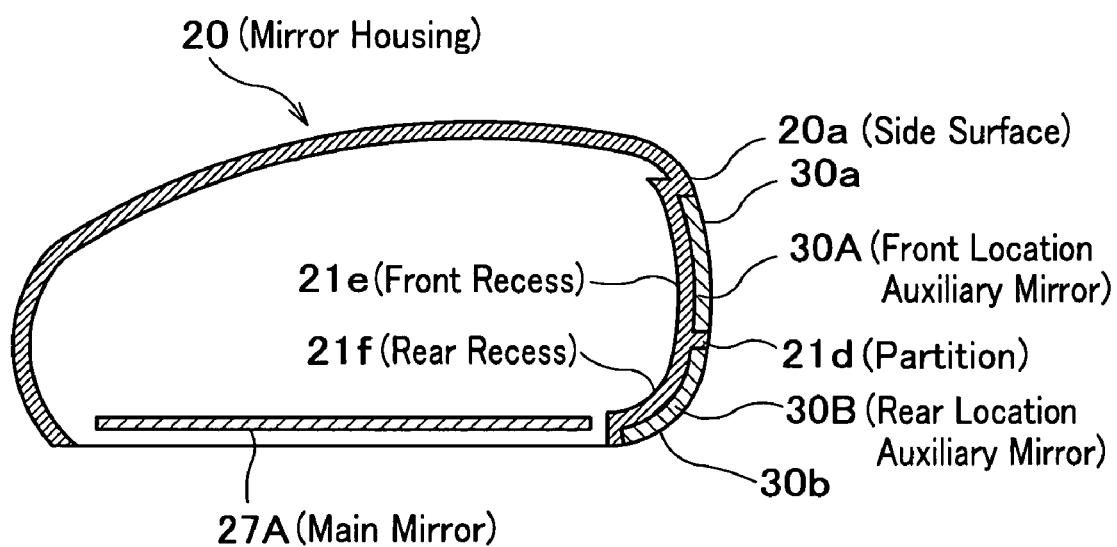
FIG. 24 is a cross sectional drawing that shows an outer mirror according to the sixth embodiment.

For the outer mirror according to the first embodiment, the first auxiliary mirror 30 is made of a single mirror and is set facing obliquely downward facing obliquely downward and slantingly frontward. However it may be preferred that the first auxiliary mirror 30' in the outer mirror according to the sixth invention as shown in FIG. 23 is separated into two piece of mirrors as the front location auxiliary mirror 30a and the rear location auxiliary mirror 30b that are set facing obliquely downward. In other words, the auxiliary mirror composes of a front location auxiliary mirror 30a and a rear location auxiliary mirror 30b which have different directions but are adjacently attached. In the present embodiment, a partition 21d is formed between the front location auxiliary mirror 30a and the rear location auxiliary mirror 30b.

The front location auxiliary mirror 30A of the first auxiliary mirror is made in such a way that a reflecting film is formed on the front surface or the back surface of the glass substrate and is attached to the front recess 21e formed on the side surface 20a of the mirror housing 20 with an adhesive. The surface of the front location auxiliary mirror 30A is not only a planer surface but a part of a spherical one as far as the view of the road area (which is obliquely downward and slantingly frontward of the automobile body S) close to the front wheel T1 (see FIG. 1).

The rear location auxiliary mirror 30B of the first auxiliary mirror is made in such a way that a reflecting film is formed on the front surface or the back surface of the glass substrate and is attached to the rear recess 21f formed on the side surface 20a of the mirror housing 20 with an adhesive. The surface of the rear location auxiliary mirror 30B is not only a planer surface but a part of a spherical one as far as the view of the road area (which is obliquely downward and slantingly rearward of the automobile body S) close to the rear wheel T2 (see FIG. 1). In addition the surface may be continuously changing curvature so that the surface is not constantly spherical. In other words, the rear location auxiliary mirror 30B of the first auxiliary mirror may be one that driver can percept and monitor the range (see M2 in FIG. 19) from the side door S1 of the passenger seat to the rear wheel T2 and thereabout by watching the mirror surface 30b from the driver seat.

By using these mirrors, it is possible to continuously percept and monitor the range covering the area in the lower slanted direction towards front portion of the automobile body S (close to the front wheel T1) and the area in the lower slanted direction towards rear portion of the automobile body S (close to the front wheel T2) as shown in FIG. 19.

In addition, the driver is not necessary to largely move his or her sight at the time to percept and monitor such range since the front location auxiliary mirror 30A (mirror surface 30a) and the rear location auxiliary mirror 30B (mirror surface 30b) are close. Since the view seen in the front location auxiliary mirror surface 30a and the view seen in the rear location auxiliary mirror surface 30b are kept roughly continuous, the driver does not feel strange in these views.

The front location auxiliary mirror 30A and the rear location auxiliary mirror 30B are not necessary to continuously change the curvature since these mirrors are separated from the first auxiliary mirror 30'. It is possible to independently set the curvatures of the mirrors 30a and 30b to cover the appropriate range of the perception and monitoring, that results into a high perceptive and monitoring mirror system.

It is possible to form a functional film on the surface of the first auxiliary mirror 30' (as the mirror surfaces 30a and 30b) to maintain the perception and monitoring capability.

Being similar to the first embodiment, a position marker may be attached on the surface (mirror surface 30a and 30b) of the first auxiliary mirror 30' and the position marker made by using fluorescent paint or light emitting diode. Being similar to the third embodiment, an auxiliary position marker may be put on the side window SW, locating between the first auxiliary mirror 30' and the driver seat H' (see FIG. 18), at the position corresponding to the position marker attached to the auxiliary mirror 30'. The auxiliary position marker may be made in a form of a rod which is installed in a stand to pops up when the driver check the position of the automobile and painting a fluorescent paint or setting a light emitting device to the auxiliary marker are preferred.

In this embodiment, the front location auxiliary mirror 30A and the rear location auxiliary mirror 30B are attached to the mirror housing 20 by using an adhesive. However these mirrors can be set the mirror housing 20 by mounting onto an actuator similar to the manual actuator 60 as shown in FIG. 9 or the electric actuator 70. Then it is possible to adjust the setting angles of the front location auxiliary mirror 30A and the rear location auxiliary mirror 30B in manual method or in electrical powered method.

Being similar to the second embodiment, a light beam emitting device that emits a light beam on to the areas along the peripheral side of the automobile body S may be installed, by which the driver percepts or monitors these areas by using the front locating auxiliary mirror 30A and rear location auxiliary mirror 30B.

In this embodiment, the first auxiliary mirror 30' is separated into the front location auxiliary mirror and the rear location auxiliary mirror but can be separated into an upper mirror or a lower mirror wherein one of these mirrors faces obliquely downward and frontward of the automobile and the other does obliquely downward and rearward of the automobile.

Seventh Embodiment

Figure 25:
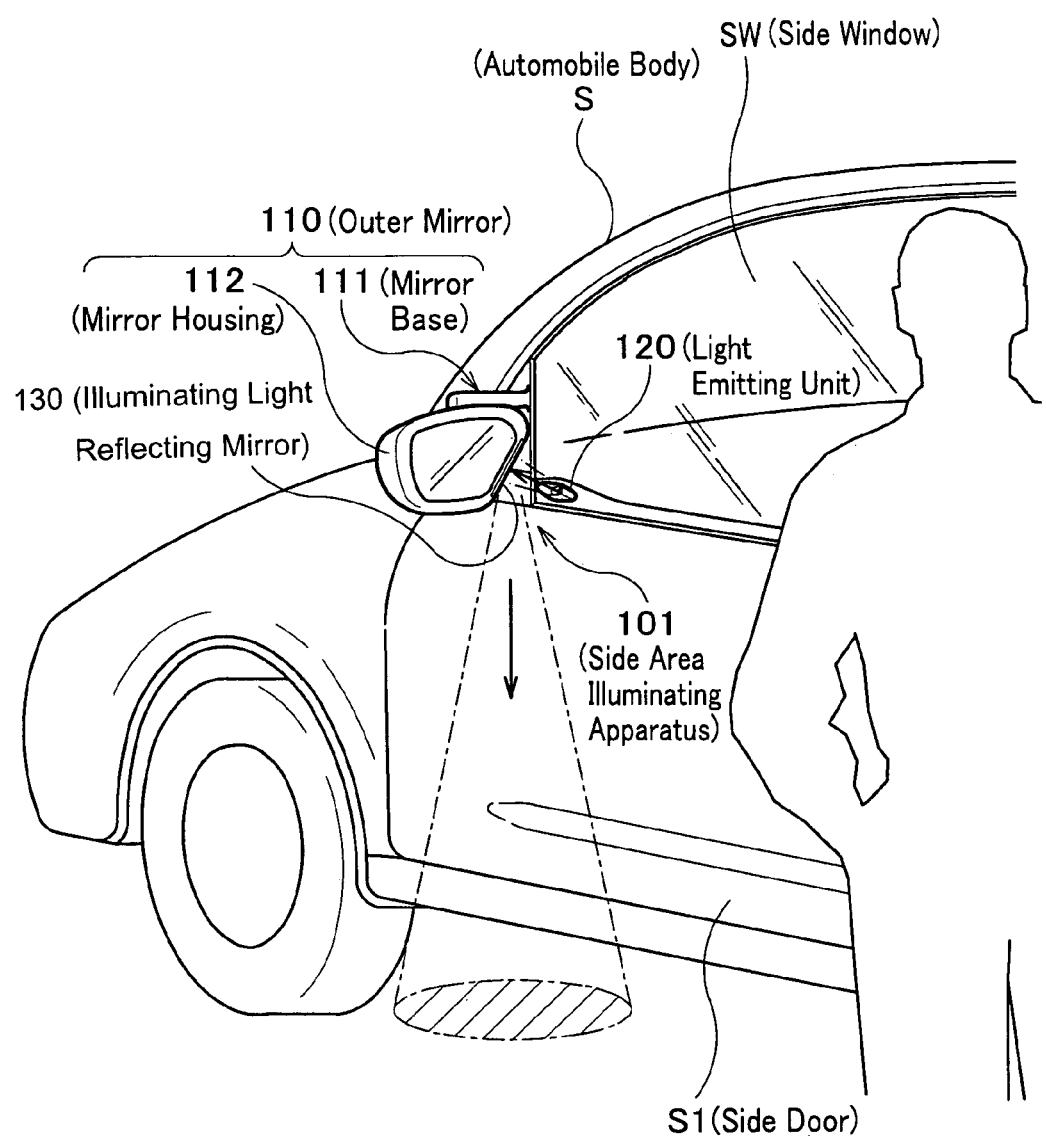
FIG. 25 is a perspective drawing that shows a side area illuminating apparatus according to the seventh embodiment.

As shown in FIG. 25, the outer mirror according to this embodiment comprises a mirror base 111 that is fixed on the front end of side window SW attached to the automobile body and a mirror housing 112 suspended under the mirror base 111. The mirror housing 112 has an illuminating light reflecting mirror 130 on the side facing to the side of the automobile body S. The illuminating light reflecting mirror 130 reflects the lights from a light emitting unit 120 to the lower direction aside the side door S1 (as shown in a hatched area).

The reflecting mirror can be used as the mirror that the driver uses to percept and monitor the lower left side of the automobile body S. The automobile body S includes a pillar and a side door S1 hereinafter. Each component used in a series of the following embodiments is explained as below.

(Outer Mirror)

Figure 26:
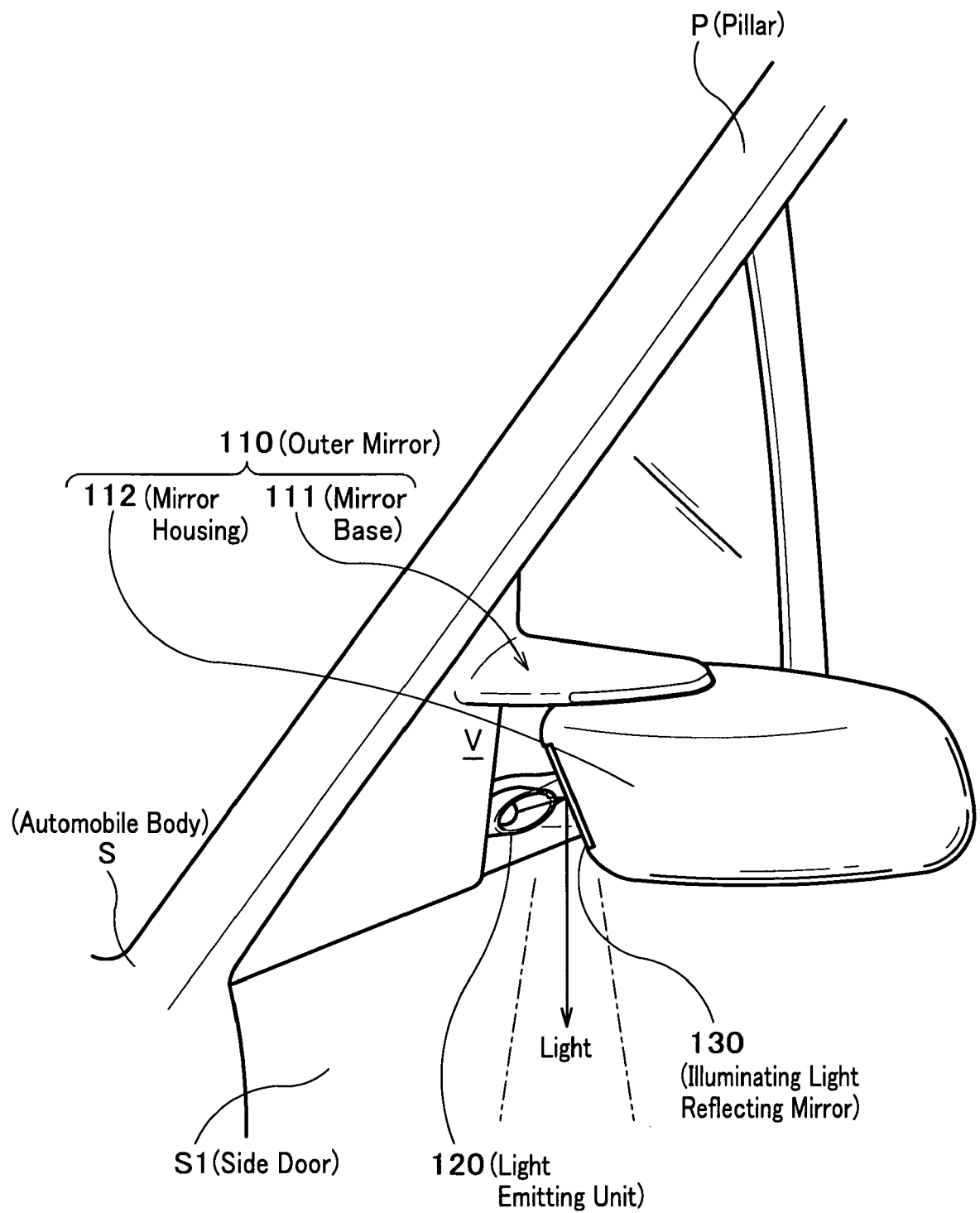
FIG. 26 is a schematic that shows an enlarged view of FIG. 25.
Figure 27:
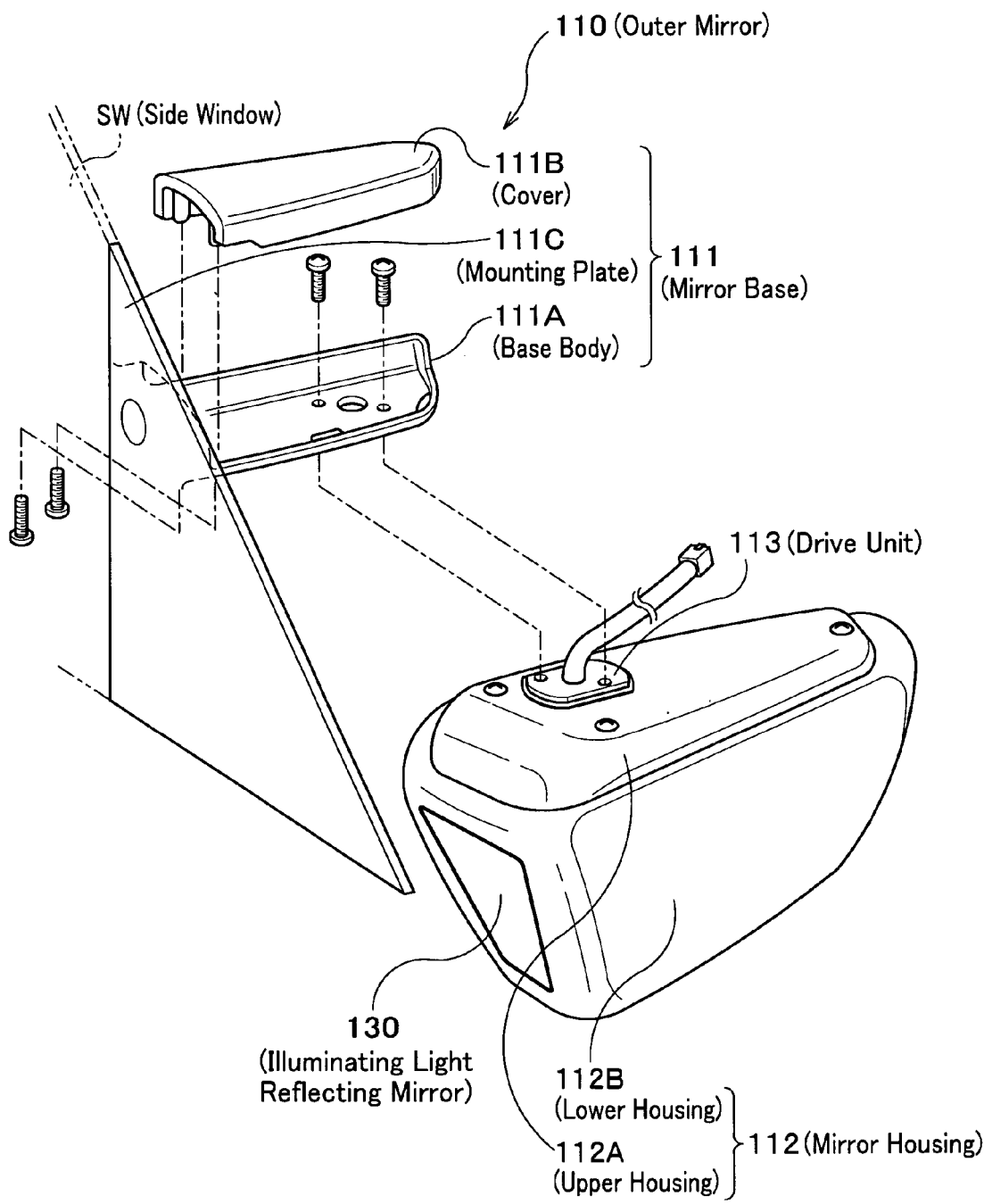
FIG. 27 is an exploded perspective drawing that shows an outer mirror according to the seventh embodiment

The outer mirror 110 used for a side area illuminating apparatus 111 comprises, as shown in FIG. 26 and FIG. 27, a mirror base 111 and a mirror housing to which a rear direction viewing mirror M is attached and in which a drive unit is installed for rotating the mirror housing.

The mirror base 111 of the outer mirror 110 comprises a mounting plate 111C fixed to the forward end of the side mirror and a base body 111A of streamline shape is formed in a single mold unit with the mounting plate. A cover 11B is put on the base body 111A.

It is not necessary to form the base body 111A in a single mold unit with the mounting plate 111C as far as it composes of the mirror base 111. Then the mirror base 111 can be fixed to the forward end of the side mirror.

Figure 28:
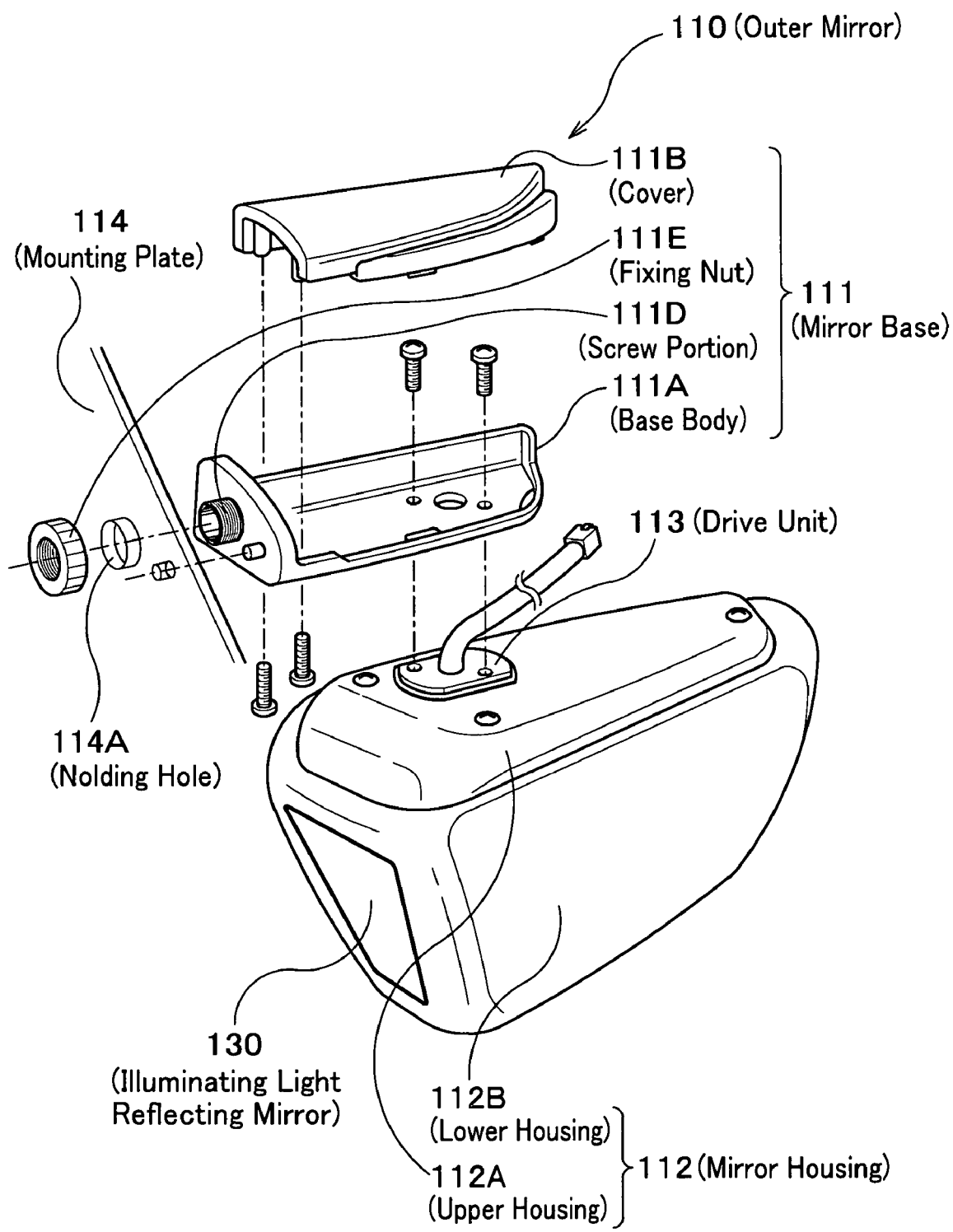
FIG. 28 is an exploded perspective drawing that shows another outer mirror according to the seventh embodiment.

For example, as shown in FIG. 28, the mirror base 111 of the outer mirror 110 comprises the base body 111A formed in a streamline shape unit and extending sideward and the cover 111B to be attached to the top of the base body 111A. The base body is fixed to the mounting plate 114 which is fixed to the lower part of the forward end of the side window SW. A screw portion 111D which has a through hole is formed in the side wall of the base body 111A that contacts to the mounting plate 114. The screw portion 111D is set through a holing hole 114A and fixed with a fixing nut 111E in a screw fixing.

The mirror housing comprises an upper housing 112A and the lower housing 112B. An illuminating light reflecting mirror 130 is attached to the side (of the lower mirror housing 112B) facing to the automobile body S. The side of the lower mirror housing has an angle opening downward.

The angle of the side of the lower mirror housing 112B is designed as the light from the light emitting unit 120 is reflected toward the area at the door step at the side door S1 by the illuminating light reflecting mirror 130.

The drive unit 113 is fixed to the upper housing 112A. The upper housing 112A is rotated around a shaft (as noted "40" in FIG. 3) which is set to the base body 111A. The mirror housing 112 is rotated by the driver unit 113C and is set to the housing position with rotating around the shaft.

The separation distance V between the mirror housing 112 and the automobile body S can be arbitrarily designed depending on the physical sizes of the mirror base 111 and the mirror housing 112 and the mounting position between the mirror base 111 and the mirror housing 112.

The illuminating light reflecting mirror 130 is a head surface mirror since the reflectivity to the light from the light emitting unit 120 can be high. When the illuminating light reflecting mirror 130 is a back surface mirror, then the illuminated area becomes blurred as well as the reflectivity decreases due to multiple reflection the front surface of the mirror glass substrate and the mirror surface formed on the back surface of the mirror substrate. Reversely, a front surface mirror is used for the illuminating light reflecting mirror 130, high reflectivity is maintained and the illuminating area can be clearly determined.

The light emitting unit 120 of the side area illuminating apparatus 101 is installed in the side door S1 and switched on and off by an electric answer back system. The light emitting unit 120 emits a light that is reflected on the illuminating light reflecting mirror 130 attached to the lower mirror housing 112B. Therefore the light emitted from the light emitting unit 120 is reflected by the illuminating light reflecting mirror 130 and illuminates the door step of the driver or the passengers.

Since the light emitting unit 120 is installed in the side door, the cabling for the light emitting unit 120 is easy in the assembling.

The light emitting unit 120 is switched on or off by an electric answer back system in response to the locking or unlocking of the automobile door. The answer back system senses the key-in action for locking or unlocking. The light emitting unit 120 is switched on for emitting the light when the answer back system senses the key-in action. When the switching is done by a remote controller attached to the key, the answer back system receives the control signal and the light emitting unit 120 is switched on for emitting the light.

The remote controlling described above is done by a key or a remote control system called "key less entry" or "smart entry" which is registered as a Japanese trademark. When the remote controller holder approaches to the automobile and enters into an effective area, then the light emitting unit is switched on and emits the light by sending an unlock signal.

Eighth Embodiment

Figure 29A:
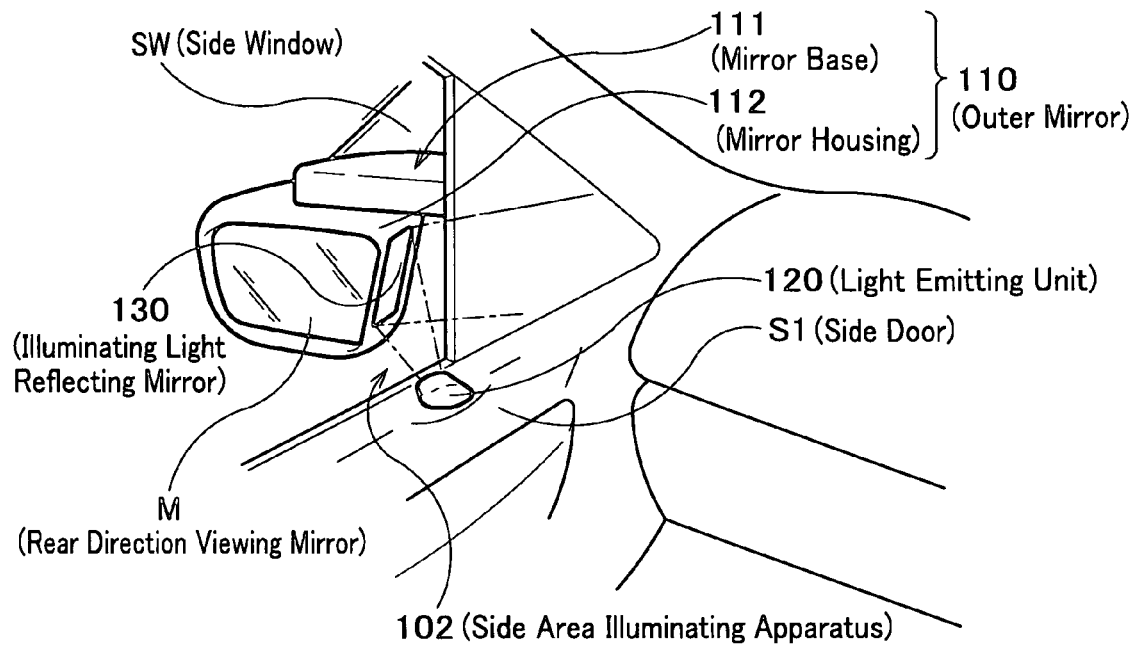
FIG. 29A is a perspective drawing that shows a side area illuminating apparatus according to the eighth embodiment of the present invention.
Figure 29B:
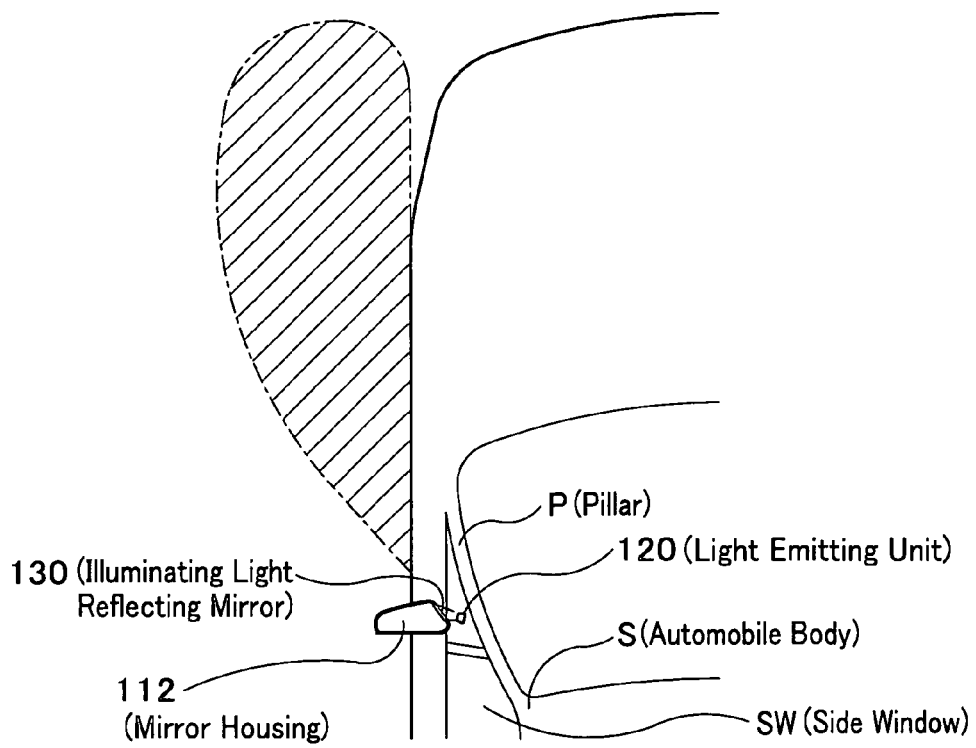
FIG. 29B is a schematic that shows an implementation of side area illuminating apparatus according to the eighth embodiment of the present invention.

The side area illuminating apparatus 102 according to the eighth embodiment of the present invention has, as shown in FIG. 29A and FIG. 29B, the illuminating light reflecting mirror 130 on the side of the lower mirror housing 102B, wherein the side is facing slantingly frontward of the automobile body S which is different from the seventh embodiment. Therefore it is possible to illuminate the different area around the automobile without largely changing the location of the light emitting unit 120. Therefore a single cabling design for the light emitting unit 120, therefore the design of the harness for the light emitting unit 120, can support the variation of the design of the side area illuminating apparatus over the present plural embodiments.

The light emitted from the light emitting unit which is installed in the driver cabin is reflected by the illuminating light reflecting mirror 130 and then illuminates the side front area of the automobile. Therefore it is easy to percept and monitor the front area of the side of the automobile body S from the driver seat even in the night. The side area illuminating apparatus assists the driver to drive in a narrow path in the night or park or stop in a narrow area in the night by confirming the safety by using the side area illuminating apparatus.

Ninth Embodiment

Figure 30:
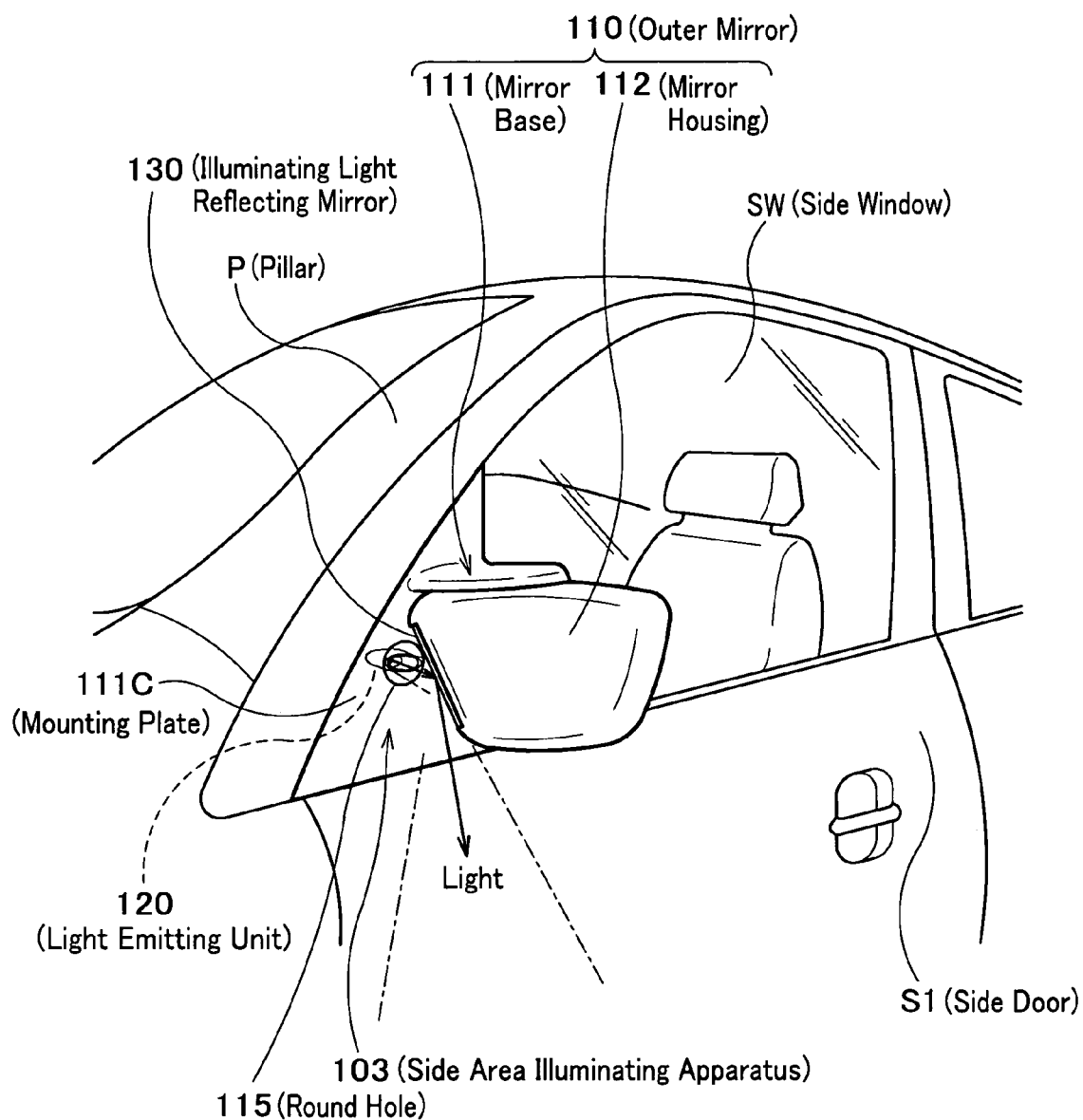
FIG. 30 is a perspective drawing that shows a side area illuminating apparatus according to the ninth embodiment of the present invention.

The side area illuminating apparatus 103 according to ninth embodiment of the present invention has a light emitting unit 120 installed in the mounting plate 111C in the mirror base 111 as shown in FIG. 30. The light emitted from the light emitting unit 120 comes out through a round hole 115 formed in the mounting plate 111C and is reflected downward by the illuminating light reflecting mirror 130 to illuminate the door step area. By adjusting the setting angle of the light emitting unit 120 and that of the illuminating light reflecting mirror 130, it is possible to illuminate the front area of the automobile and the side front area of the automobile.

Since the light emitting unit 120 is installed in the mirror base, the light is not blocked by the smear or the condensation on the side window SW or by the rain drops hitting on the side window SW.

The round hole 115 through which the light comes out can be sealed up by a transparent material.

Tenth Embodiment

Figure 31:
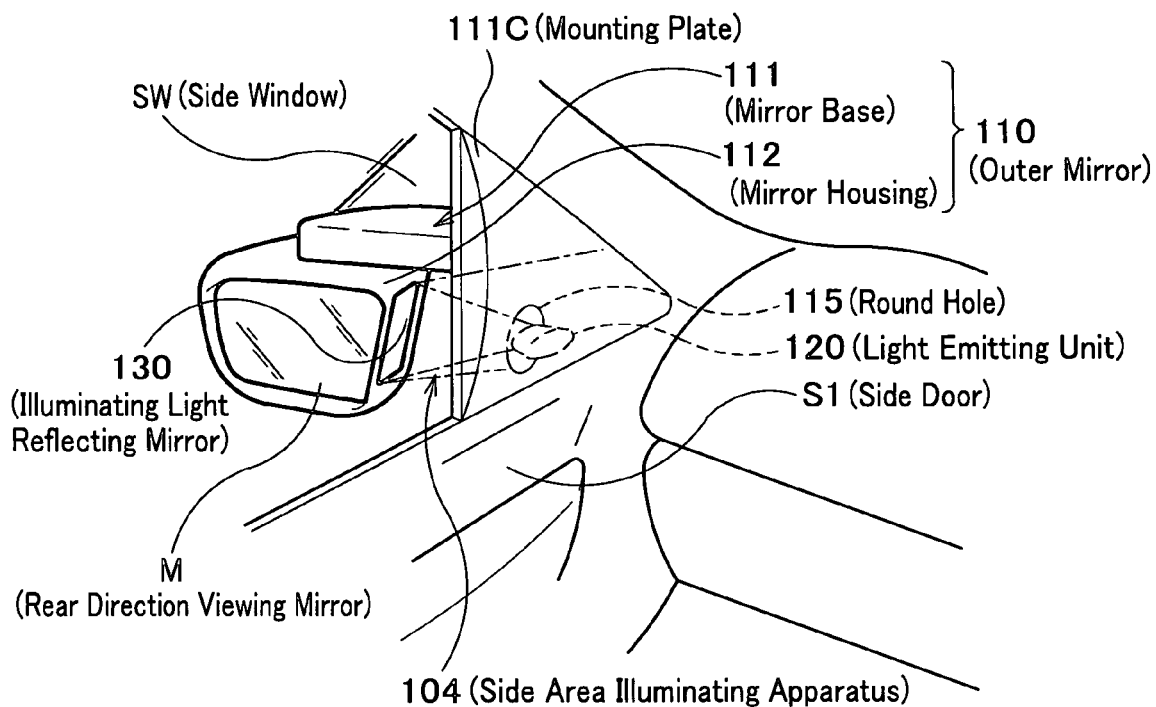
FIG. 31 is a perspective drawing that shows a side area illuminating apparatus according to the tenth embodiment.

The side area illuminating apparatus 104 according to tenth embodiment of the present invention, as shown in FIG. 31, has a difference from the ninth embodiment in the part such that the illuminating light reflecting mirror reflects the light emitted from the light emitting unit 120 to the front area of the automobile since the mirror mounting surface declines to the front area.

Eleventh Embodiment

Figure 32:
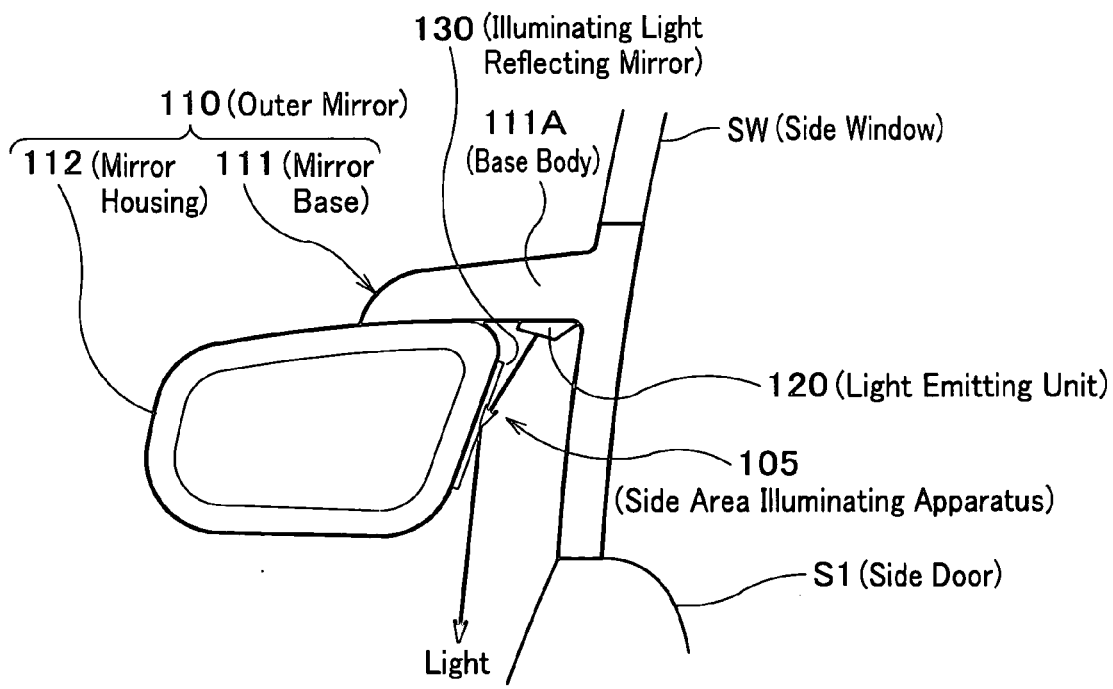
FIG. 32 is a perspective drawing that shows a side area illuminating apparatus according to the eleventh embodiment of the present invention.
Figure 33:
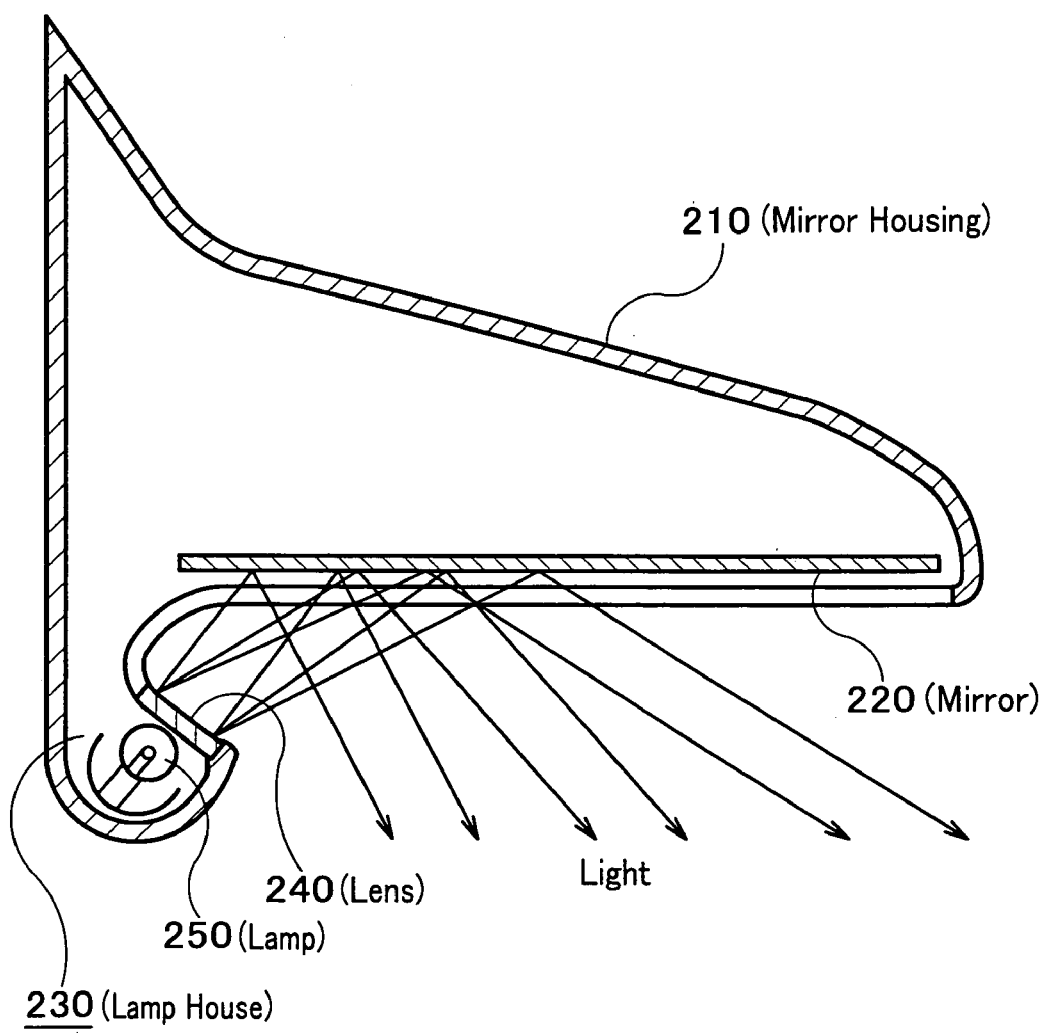
FIG. 33 is a cross sectional drawing that shows the conventional side area illuminating apparatus.

The side area illuminating apparatus 105 according to tenth embodiment of the present invention, as shown in FIG. 32, has a difference from those embodiments from the seventh to tenth embodiments in a part such that the light emitting unit 120 is installed in the base body 111A of the mirror base 111 and therefore the light comes out from the bottom surface of the base body.

Since the side area illuminating apparatus has a variation of the implementation of those 101, 102, 103, 104 and 105 and the separation distance V from the automobile body S to the mirror housing 112 which may be a major ruling factor to decide the illuminating areas, the side area illuminating apparatuses according to the present invention can be applied to various kinds of automobile by selecting such variation and a little modification of installing position of the light emitting unit 120 and the separation distance V without chaining or adding the optical components necessary for the side area illuminating apparatus.

As discussed above, several preferred embodiments have been explained. However the present invention is not confined in these embodiments and the elements of the invention can be modified for the purpose of optimum design depending on the applications.

For example, the construction design such that the setting angle of the illuminating light reflecting mirror 130 attached on the side surface of the lower mirror housing 112B, wherein the side surface is facing to the automobile body S, is adjustable is adopted and then the light emitted from the light emitting unit 120 can be reflected to a desired direction in order to illuminate a desired area. Also it is possible to design the installation position of the light emitting unit not only in the side door Si but the pillar P and another potion of the automobile body S.

As having discussed above, this invention has advantages and features that the outer mirror use for automobiles comprises a mirror housing and a mirror base which suspends the mirror housing that has a main mirror and one or more auxiliary mirrors. The auxiliary mirror provides better perception and monitoring capability for the driver around the automobile, which results in assisting safe driving of the automobile. The side area illuminating apparatus has an illuminating light reflecting mirror attached to the mirror hosing and can have a physical variations for the separation distance from the automobile body to the mirror housing, that results in a wide range of illuminating areas around the sides of the automobile and therefore in providing better perception and monitoring capability for the driver around the automobile and therefore assisting safe driving of the automobile. All of these features contribute to and serve for assisting drivers to perfume safe driving.

What is claimed is:

1. An outer mirror comprising:
    a mirror base attached on a side surface of an automobile body and extending sideward from said side surface of said automobile body;
    a mirror housing suspended underneath said mirror base with a separation distance from said side surface of said automobile body, the mirror housing being rotatable to be reset into a housing position;

a first auxiliary mirror facing obliquely downward and attached to a side surface of the mirror housing facing to said side surface of said automobile body; and a second auxiliary mirror facing obliquely downward and attached to a side of said mirror base facing rearward of said automobile body, said second auxiliary mirror having a position marker thereon indicating a position of said automobile body.

2. An outer mirror as defined in claim 1, wherein said first auxiliary mirror is divided into two mirrors, one of which faces frontward of said automobile body and the other of which faces backward of said automobile body.

3. An outer mirror according to claim 1, wherein a facing direction of said second auxiliary mirror is adjustable.

4. An outer mirror according to claim 1, wherein said position marker can emit a light.

5. An outer mirror according to claim 1, wherein an auxiliary position marker is further set between said second auxiliary mirror and a driver seat.

6. An outer mirror according to claim 5, wherein said auxiliary position marker is constructed in a popping up and down mechanism.

7. An outer mirror according to claim 5, wherein said auxiliary position marker can emit a light.

8. An outer mirror according to claim 1, wherein a functional film to maintain perception and monitoring capability of said second auxiliary mirror is formed on a surface thereof.

9. An outer mirror according to claim 1, wherein said mirror base has a light beam emitting device that illuminates areas aside from said automobile and areas in a range of road area viewed in said second auxiliary mirror.

10. An outer mirror according to claim 1, wherein said mirror housing has a sub mirror in a lower potion partitioned from a main mirror both of which mirrors are attached onto an open window facing rear side, said sub mirror facing obliquely downward.

11. An outer mirror according to claim 10, wherein a facing direction of said sub mirror is adjustable.

12. An outer mirror according to claim 10, wherein a functional film to maintain perception and monitoring capability of a surface of said sub mirror is formed thereon.

13. An outer mirror according to claim 1, wherein a facing direction of said first auxiliary mirror is adjustable.

14. An outer mirror according to claim 1, wherein said first auxiliary mirror has a position marker thereon indicating a position of said automobile body.

15. An outer mirror according to claim 14, wherein said position marker of said first auxiliary mirror can emit a light.

16. An outer mirror according to claim 14, wherein an auxiliary position marker is further set between said first auxiliary mirror and a driver seat.

17. An outer mirror according to claim 16, wherein said auxiliary position marker is constructed in a popping up and down mechanism.

18. An outer mirror according to claim 16, wherein said auxiliary position marker can emit a light.

19. An outer mirror according to claim 1, wherein a functional film to maintain perception and monitoring capability of a surface of said first auxiliary mirror is formed thereon.

20. An outer mirror according to claim 1, wherein said mirror base has a light beam emitting device that illuminates areas aside from said automobile and areas in a range of road area viewed in said first auxiliary mirror.

* * * * *